United States Patent
Fukui et al.

[11] Patent Number: 5,936,518
[45] Date of Patent: *Aug. 10, 1999

[54] METHOD FOR JUDGING VEHICLE COLLISION

[75] Inventors: Tsutomu Fukui; Kazuo Matsuda, both of Wako, Japan

[73] Assignee: Honda Giken Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/739,754

[22] Filed: Oct. 29, 1996

[30] Foreign Application Priority Data

Oct. 31, 1995 [JP] Japan .................................. 7-284036
Nov. 6, 1995 [JP] Japan .................................. 7-287386

[51] Int. Cl.⁶ .................................................. B60Q 1/00
[52] U.S. Cl. .......................... 340/436; 340/438; 280/735; 701/36; 701/47
[58] Field of Search .................. 340/436, 438; 364/424.055, 424.056, 424.057; 280/728.1, 735; 701/45, 46, 47, 36

[56] References Cited

U.S. PATENT DOCUMENTS

| | | | |
|---|---|---|---|
| 4,641,138 | 2/1987 | Opitz | 342/192 |
| 5,034,891 | 7/1991 | Blackburn et al. | 364/424.05 |
| 5,036,467 | 7/1991 | Blackburn et al. | 364/424.05 |
| 5,065,322 | 11/1991 | Mazur et al. | 364/424.05 |
| 5,073,860 | 12/1991 | Blackburn et al. | 364/424.05 |
| 5,396,424 | 3/1995 | Moriyama et al. | 364/424.05 |
| 5,397,221 | 3/1995 | Schulter et al. | 364/424.05 |
| 5,587,906 | 12/1996 | McIver et al. | 364/424.045 |

FOREIGN PATENT DOCUMENTS

| | | |
|---|---|---|
| 41 10 891A1 | 4/1991 | Germany . |
| 41 10 892A1 | 4/1991 | Germany . |
| 42 13 673A1 | 4/1992 | Germany . |
| 42 23 562A1 | 7/1992 | Germany . |
| 5-221286 | 8/1993 | Japan . |
| 52 21 286 | 8/1993 | Japan . |

*Primary Examiner*—Jeffery A. Hofsass
*Assistant Examiner*—Ashok Mannava
*Attorney, Agent, or Firm*—Armstrong, Westerman, Hattori, McLeland & Naughton

[57] ABSTRACT

A method for judging vehicle collision in which an output signal from an acceleration sensor carried on a vehicle, which is obtained from a time of start of judgment on collision, is outputted through interval windows each having a predetermined time width of a plurality of sampling cycles and provided as those successively delayed by one sampling cycle respectively. A waveform of the output signal is Hadamard-transformed and decomposed into frequency components for each of the interval windows by using an Hadamard-transforming unit. A threshold value set for a predetermined frequency component and outputted from a threshold-outputting unit is compared with a level value of the predetermined frequency component selected from the frequency components obtained by the decomposition in the Hadamard-transforming unit, by using a collision-judging unit. Occurrence of collision of the vehicle is judged on the basis of a result of the comparison.

12 Claims, 16 Drawing Sheets

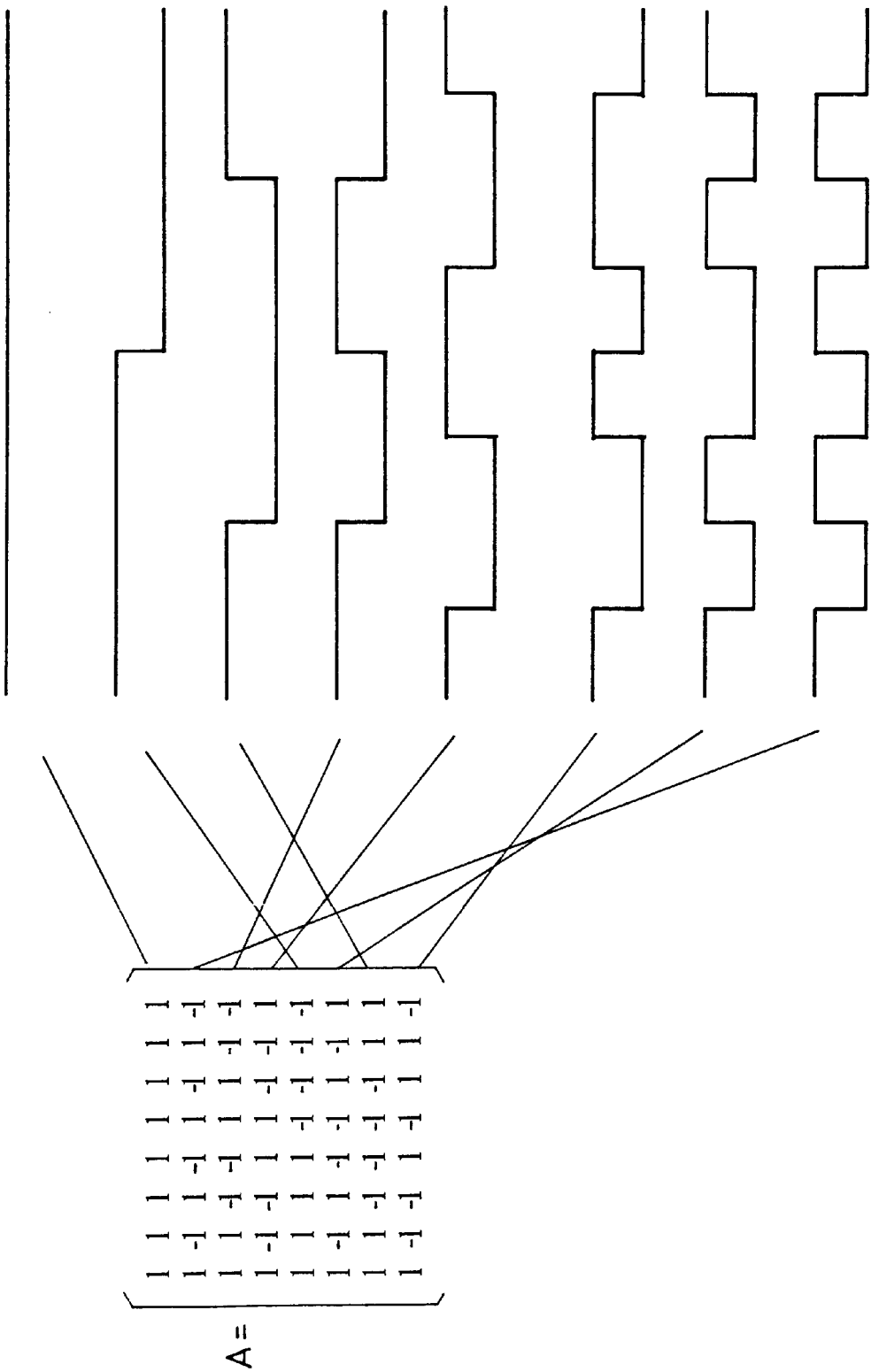

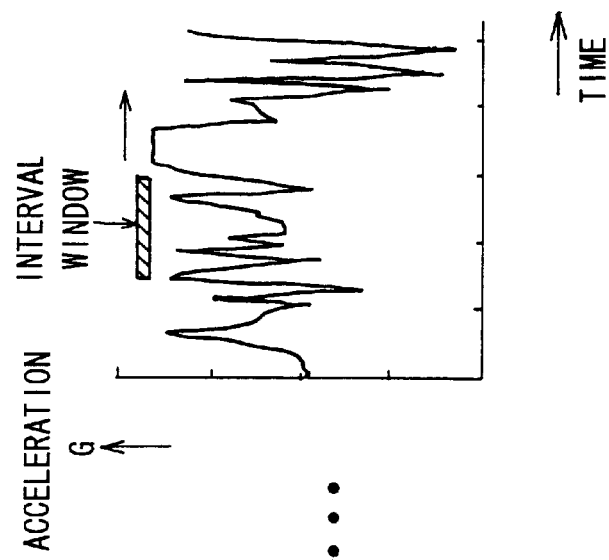
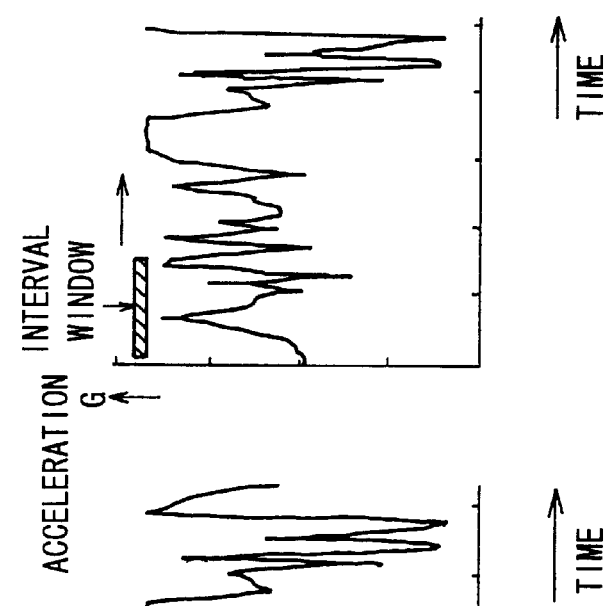
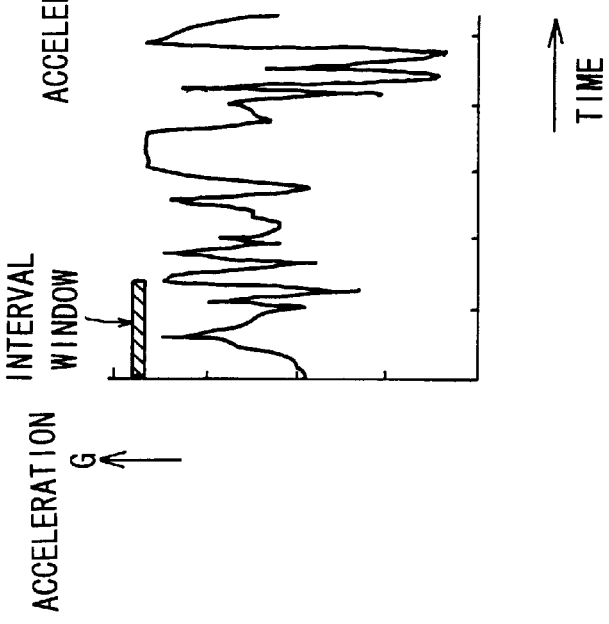

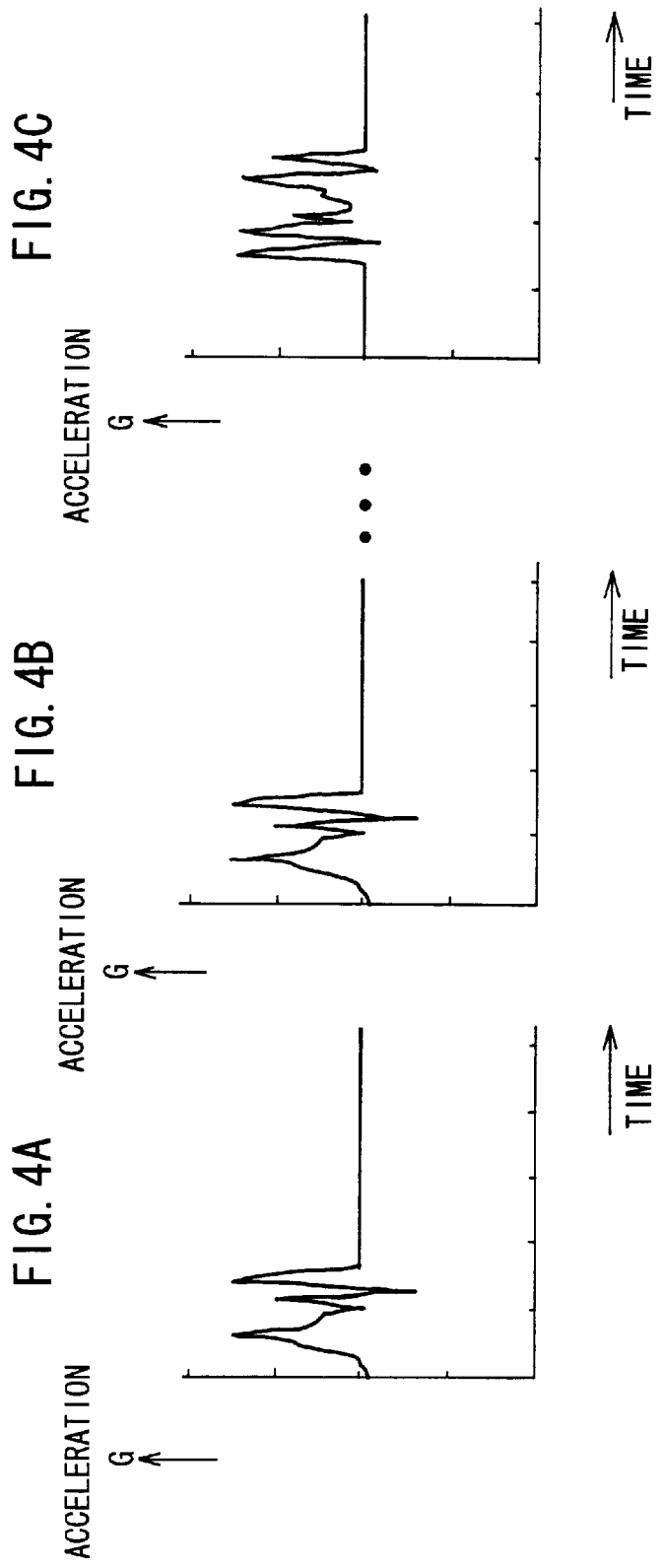

FIG. 10A
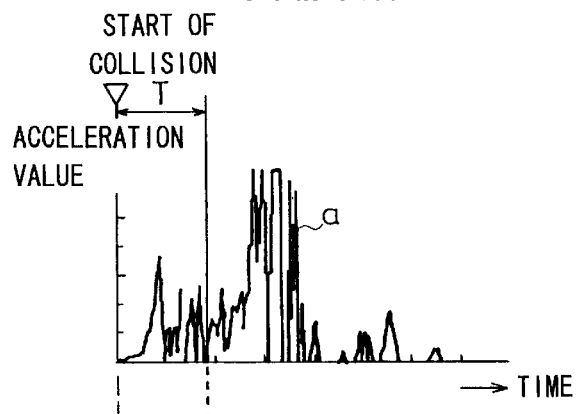
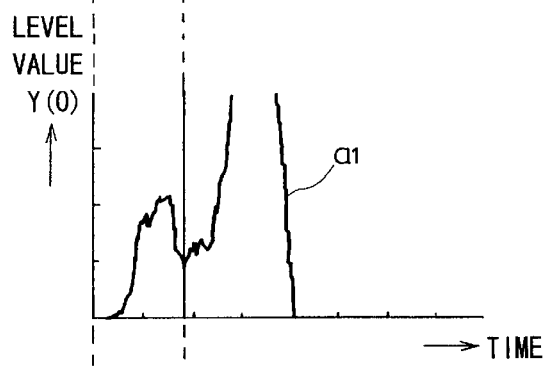
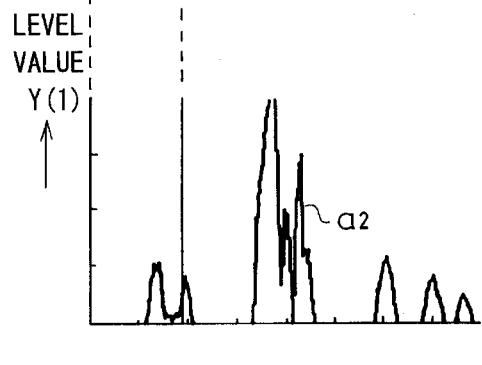
FIG. 10B
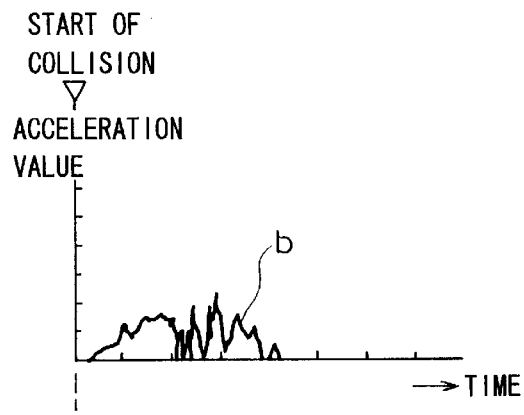
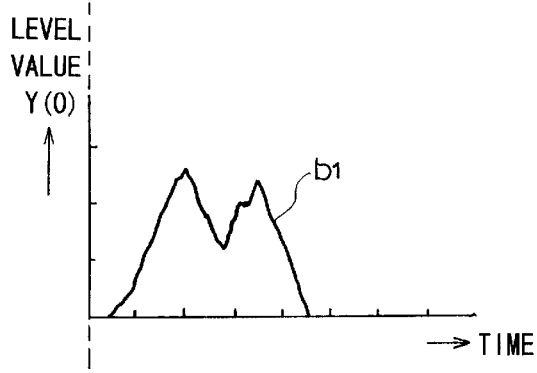
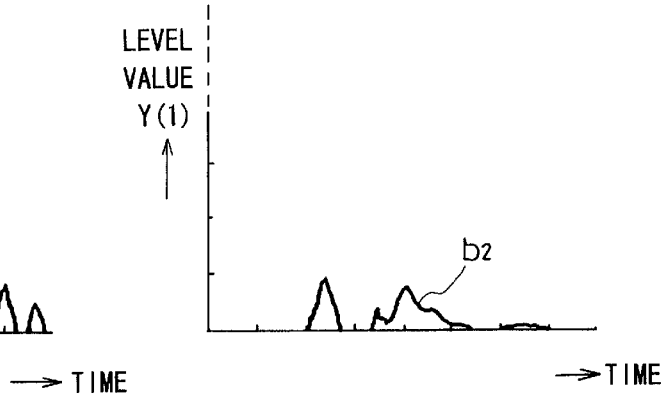

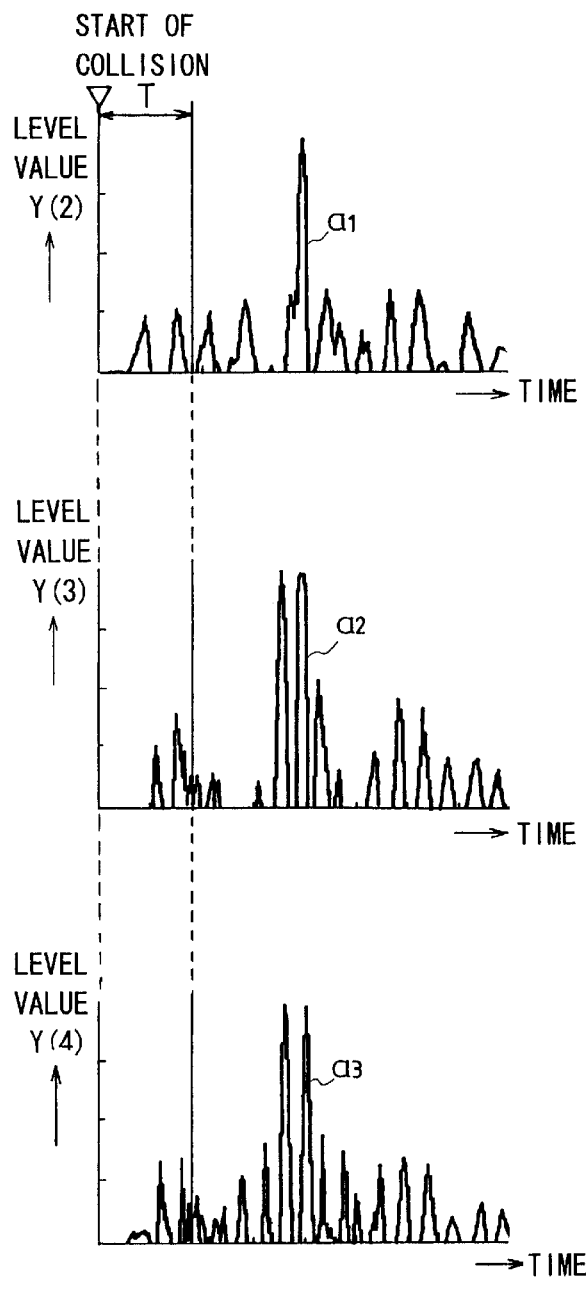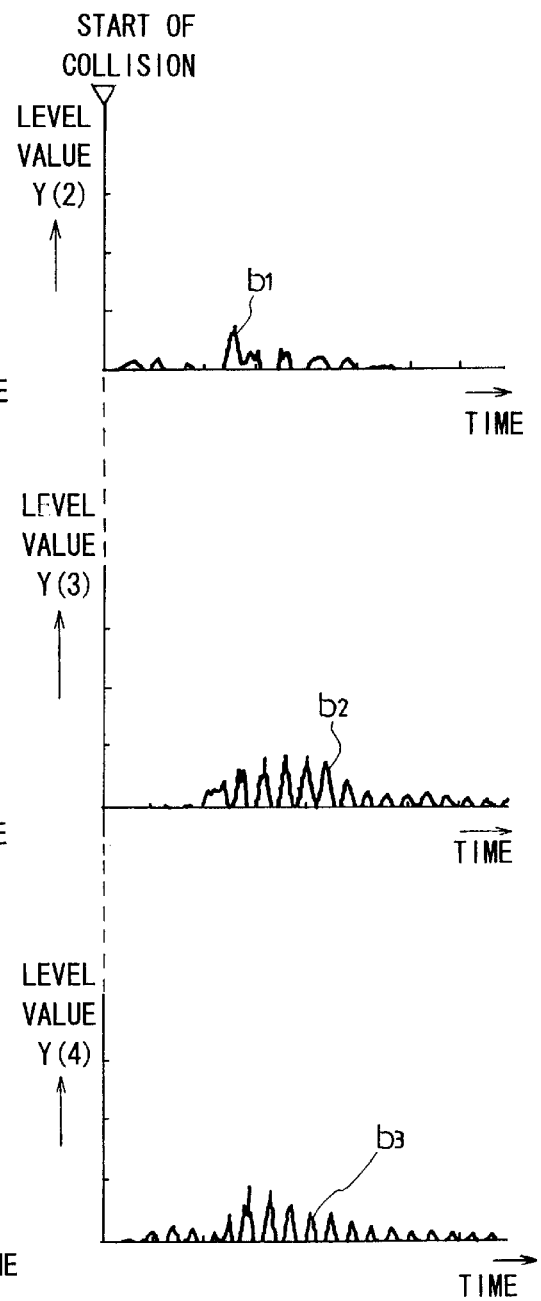

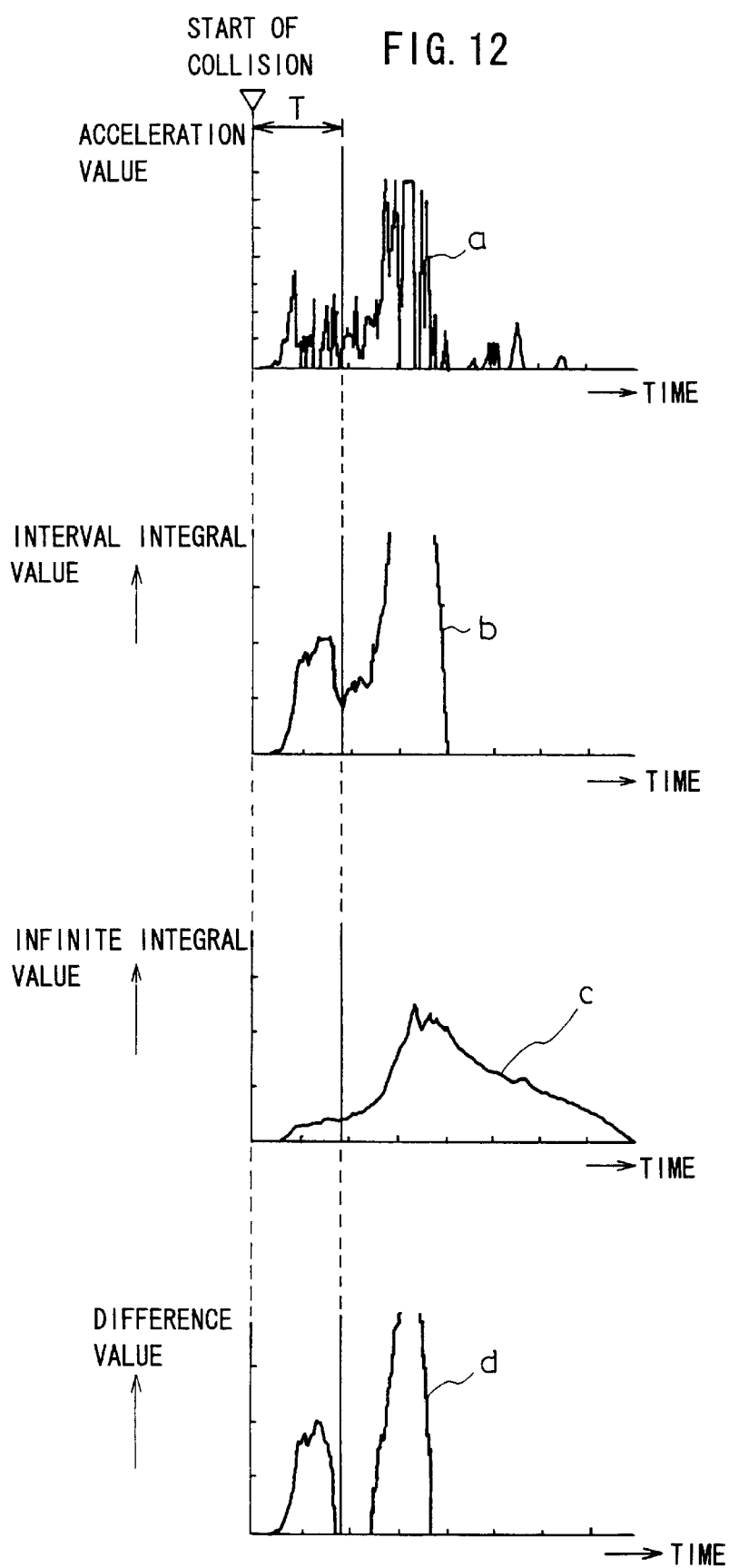

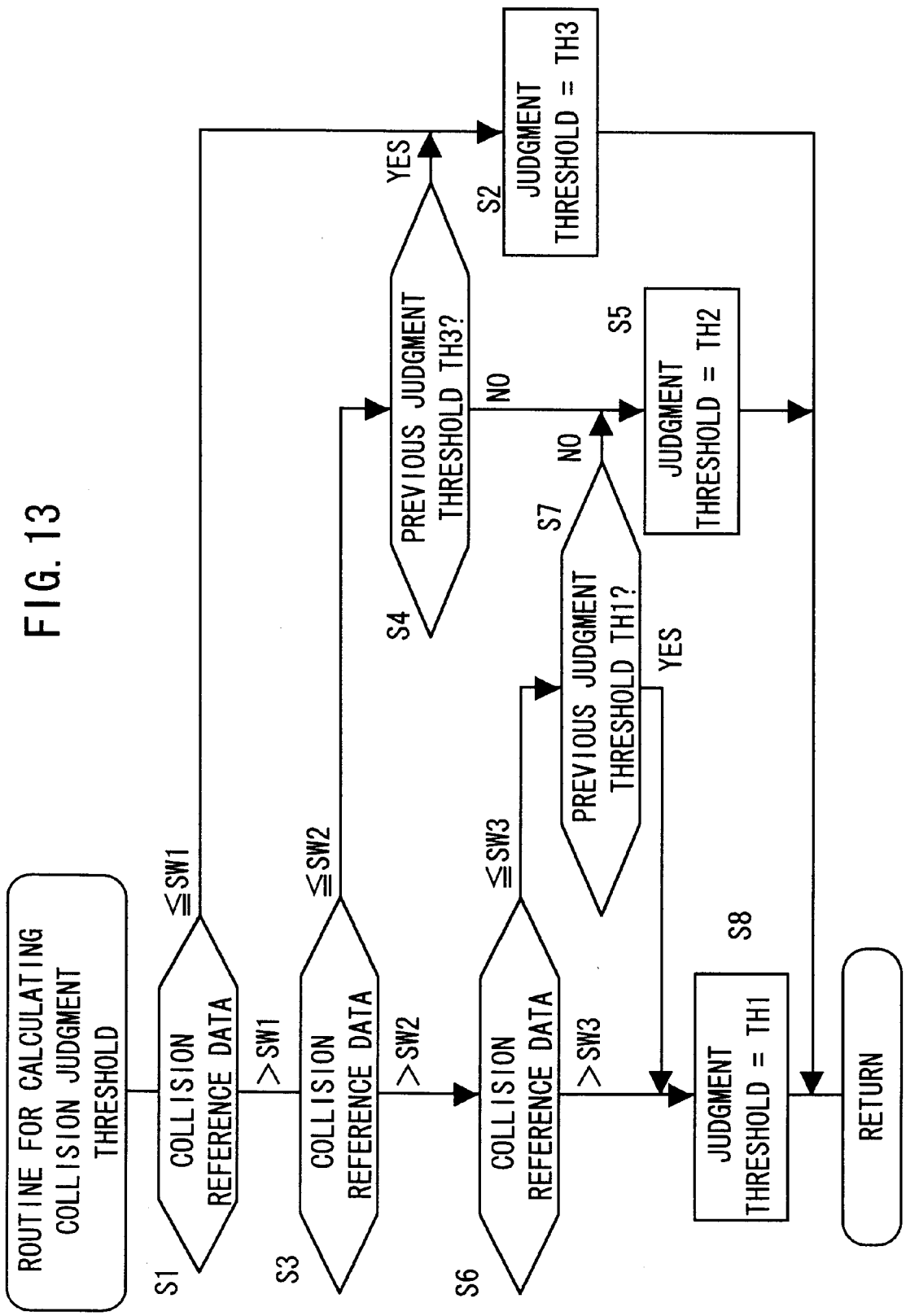

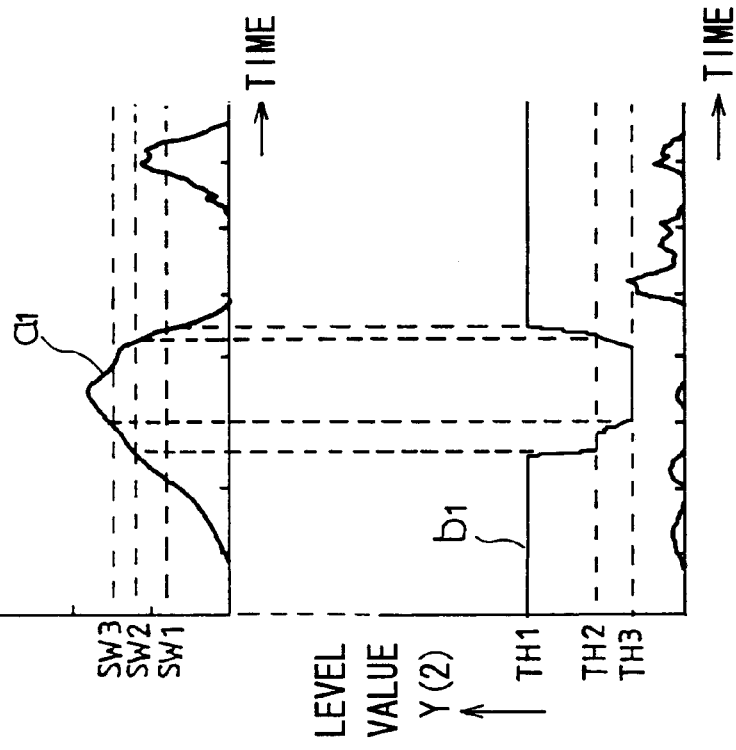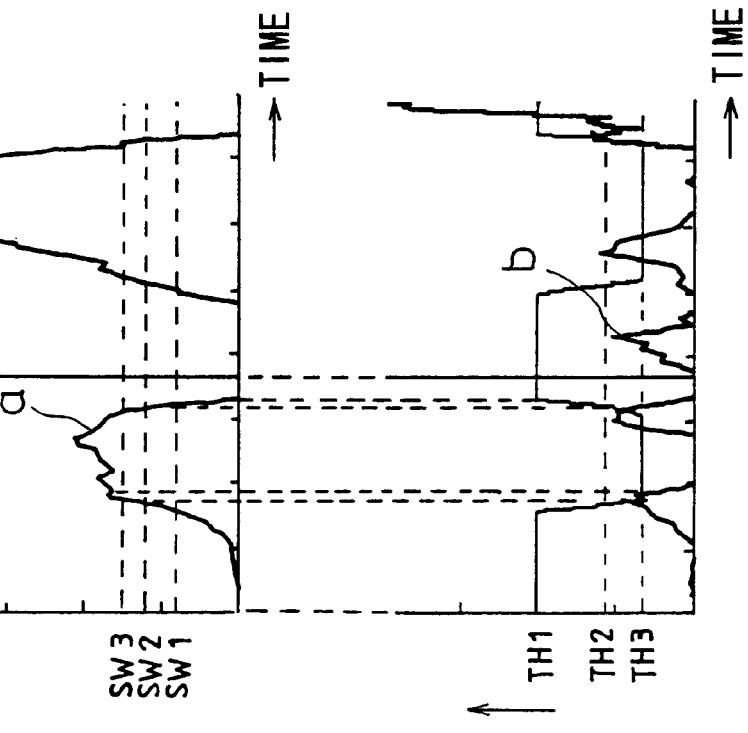

5,936,518

METHOD FOR JUDGING VEHICLE COLLISION

BACKGROUND OF THE INVENTION

1. Field of the Invention

The present invention relates to a method for judging vehicle collision, used, for example, with an apparatus to protect a passenger by inflating an air bag when it is judged that collision of a vehicle occurs.

2. Description of the Related Art

A method for judging vehicle collision comprising the following steps has been hitherto known. Namely, an output signal from an acceleration sensor installed on a vehicle is converted into digital data by A/D conversion. The converted digital data are subjected to conversion such as integration into velocity data to determine, for example, an acceleration (deceleration), a velocity, and a running distance upon collision, on the basis of which a characteristic of a waveform of the output signal from the acceleration sensor is extracted. The judgment is made on whether or not collision of the vehicle occurs, in accordance with the extracted characteristic.

Another conventional method for judging vehicle collision is disclosed in, for example, Japanese Laid-open Patent Publication No. 5-221286. In this method, an output signal from an acceleration sensor installed on a vehicle is converted into digital data by A/D conversion. The converted digital data are decomposed into frequency components by means of fast Fourier transform processing. A collision mode-judging unit is used to judge a collision mode in accordance with characteristics of the frequency components on the basis of a result of the frequency decomposition. Further, the converted digital data are integrated over a predetermined time interval to obtain an integral value. On the other hand, this system includes a collision-judging unit in which collision modes and thresholds corresponding thereto are stored. A threshold, which corresponds to the collision mode judged by the collision mode-judging unit, is read by referring to the contents of the storage in the collision-judging unit. The integral value described above is compared with the read threshold. If the integral value exceeds the threshold, it is judged that collision occurs.

An air bag is inflated if a judgment of occurrence of collision is made in accordance with the method for judging collision as described above.

SUMMARY OF THE INVENTION

When the collision of a vehicle is judged by using the former conventional method, the characteristic of the acceleration signal waveform upon collision is insufficiently extracted. Therefore, a problem arises in that it is impossible to correctly distinguish an acceleration signal for which a judgment of occurrence of collision should be made, from an acceleration signal for which a judgment of no occurrence of collision should be made, especially an acceleration signal outputted when the vehicle runs on a road on which a bump or an irregularity exists.

When the collision of a vehicle is judged by using the latter conventional method, the waveform of the acceleration signal is decomposed into frequency components by using the fast Fourier transform processing. Therefore, the following problem arises. Namely, operation and multiplication with trigonometric functions should be performed many times in order to decompose the acceleration signal waveform into the frequency components. Moreover, the threshold is switched depending on the collision mode based on a result of the decomposition into the frequency components. Therefore, an operation unit to perform the decomposition into the frequency components should be energy of each of the frequency components, which results in further increase in the number of operations.

For this reason, a problem arises in that a microprocessor such as a digital signal processor exclusively used for operation, which is capable of high-speed operation processing, is inevitably used in order to judge the collision of the vehicle without any delay. Accordingly, a problem arises in that the collision-judging apparatus becomes expensive.

In the conventional method, only the threshold is switched depending on the collision mode based on the characteristics of the decomposed frequency components. Therefore, a problem also arises in that the threshold for judging the collision has a narrow allowable range, and it is impossible to obtain a sufficient margin between a judgment of collision and a judgment of no collision.

In the conventional method, the occurrence of collision can be judged for certain types of body structures. However, for other various types of body structures, the filter characteristic and the method for judging collision should be set and established individually. Therefore, a problem arises in that a judging apparatus, in which the method for judging collision is applied in response to each type of the body, should be developed.

A first object of the present invention is to provide a method for judging vehicle collision, which makes it possible to judge collision of a vehicle without any delay without using any digital signal processor capable of high-speed operation.

A second object of the present invention is to provide a method for judging vehicle collision which makes it possible to sufficiently extract a characteristic of a acceleration signal waveform, sufficiently distinguish an acceleration signal for which a judgment of occurrence of collision should be made from an acceleration signal for which a judgment of no occurrence of collision should be made, and obtain a sufficient judgment margin.

A third object of the present invention is to provide a method for judging vehicle collision, which can be applied to various types of body structures, making it possible to widen a spacing between thresholds to make judgments of occurrence and no occurrence of collision.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 schematically shows a diagram to be used to explain a relationship between an Hadamard matrix and sequencies.

FIG. 3A schematically shows an illustration illustrating a relationship between an interval window and an output signal waveform from an acceleration sensor according to the first embodiment of the present invention, wherein the interval window is based on the start of judgment on collision.

FIG. 3B schematically shows an illustration illustrating a relationship between an interval window and the output signal waveform from the acceleration sensor according to the first embodiment of the present invention, wherein the interval window is delayed by one sampling cycle from the start of judgment on collision.

FIG. 3C schematically shows an illustration illustrating a relationship between an interval window and the output signal waveform from the acceleration sensor according to the first embodiment of the present invention, wherein the interval window is delayed by 15 sampling cycles from the start of judgment on collision.

FIG. 4A corresponds to FIG. 3A, illustrating a waveform corresponding to one block subjected to Hadamard transform.

FIG. 4B corresponds to FIG. 3B, illustrating a waveform corresponding to one block subjected to Hadamard transform.

FIG. 4C corresponds to FIG. 3C, illustrating a waveform corresponding to one block subjected to Hadamard transform.

FIG. 6 schematically shows a waveform to be used to explain decomposition of the output signal waveform from the acceleration sensor into frequency components in the first embodiment of the method for judging vehicle collision according to the present invention, wherein FIGS. 5A, 5B, and 5C are combined and illustrated in the axis of time.

FIG. 10A schematically shows waveforms to be used to explain a judgment on collision in the second embodiment of the method for judging vehicle collision according to the present invention, illustrating an output from an acceleration sensor and frequency components of Y(0) to Y(1).

FIG. 10B schematically shows waveforms to be used to explain a case of no occurrence of collision in the second embodiment of the method for judging vehicle collision according to the present invention, illustrating an output from the acceleration sensor and frequency components of Y(0) to Y(1).

FIG. 11A schematically shows waveforms to be used to explain the judgment on collision in the second embodiment of the method for judging vehicle collision according to the present invention, illustrating frequency components of Y(2) to Y(4).

FIG. 11B schematically shows waveforms to be used to explain the case of no occurrence of collision in the second embodiment of the method for judging vehicle collision according to the present invention, illustrating frequency components of Y(2) to Y(4).

FIG. 12 schematically shows waveforms to be used to explain collision reference data in the second embodiment of the method for judging vehicle collision according to the present invention, illustrating the output from the acceleration sensor, and waveforms of interval integral value, infinite integral value, and difference value determined on the basis of the output.

FIG. 13 shows a flow chart used to determine collision reference thresholds in the second embodiment of the method for judging vehicle collision according to the present invention.

FIG. 14A schematically shows waveforms to be used to explain the judgment on collision in the second embodiment of the method for judging vehicle collision according to the present invention, illustrating output signal waveforms from the acceleration sensor, to make a judgment of occurrence of collision.

FIG. 14B schematically shows waveforms to be used to explain the judgment on collision in the second embodiment of the method for judging vehicle collision according to the present invention, illustrating output signal waveforms from the acceleration sensor, to make a judgment of no occurrence of collision.

DESCRIPTION OF THE PREFERRED EMBODIMENTS

The method for judging vehicle collision according to the present invention will be explained with reference to embodiments.

Figure 1:
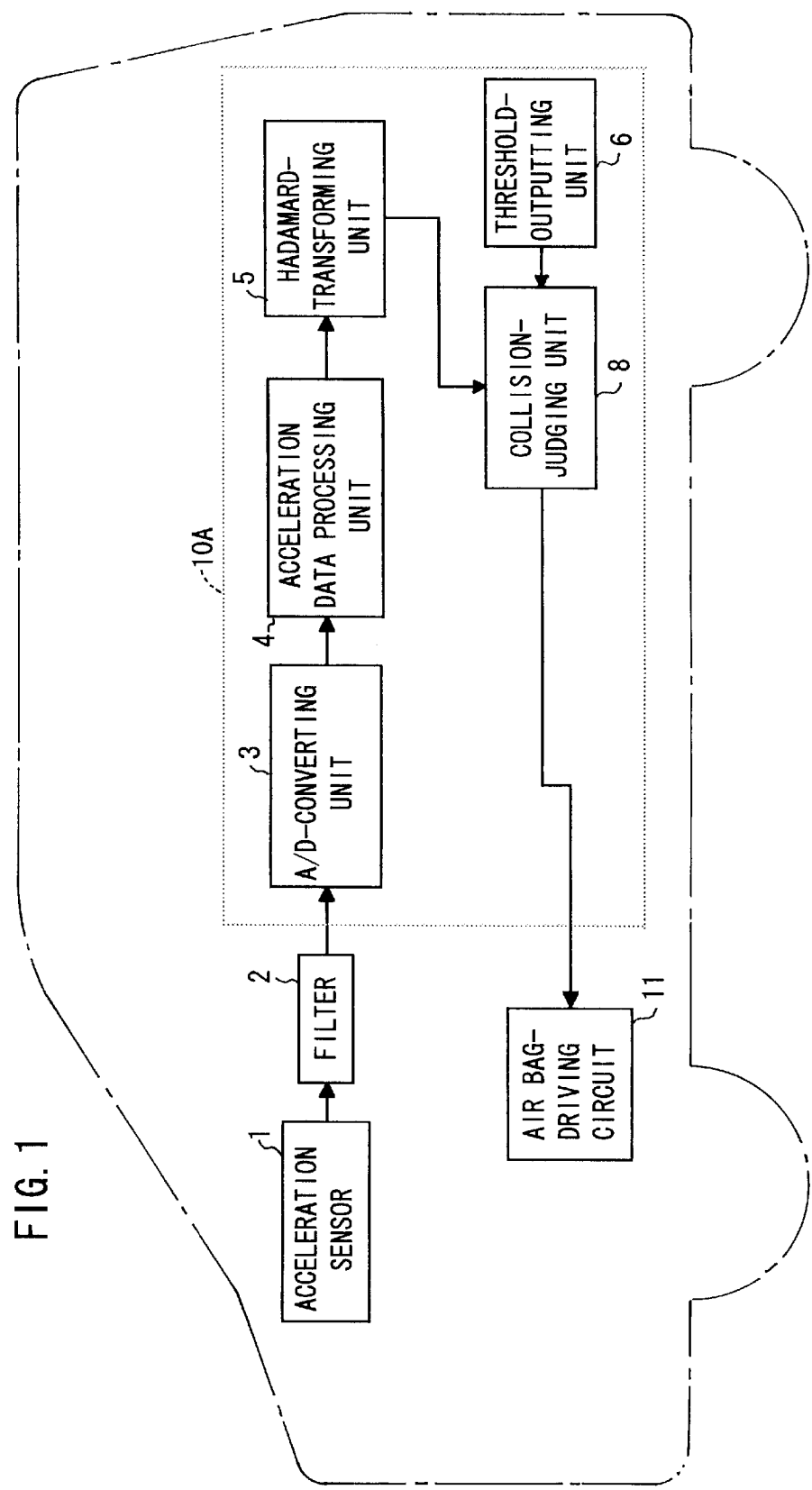
FIG. 1 shows a block diagram illustrating a system of an embodiment of a collision-judging apparatus to which a first embodiment of the method for judging vehicle collision according to the present invention is applied.

FIG. 1 shows a block diagram illustrating a system of an embodiment of a collision-judging apparatus to which a first embodiment of the method for judging vehicle collision according to the present invention is applied.

An acceleration sensor 1, a filter 2, a microcomputer 10A, and an air bag-driving circuit 11 are carried on a vehicle shown with chain lines in FIG. 1.

An output signal from the acceleration sensor 1 is supplied to the filter 2 provided to avoid aliasing. An output from the filter 2 is supplied to the microcomputer 10A.

The microcomputer 10A comprises functions of an A/D-converting unit 3 for inputting the output signal from the filter 2 thereinto and sampling the output signal from the filter 2 at predetermined sampling cycles to convert it into digital data, an acceleration data processing unit 4 for receiving the digital data obtained by conversion by the A/D-converting unit 3 and performing conversion processing such as application of a bias value to set a value of the digital data corresponding to an acceleration of zero, an Hadamard-transforming unit 5 for Hadamard-transforming an output from the acceleration data processing unit 4 to decompose it into frequency components, a threshold-outputting unit 6 for outputting threshold data previously stored corresponding to the vehicle, and a collision-judging unit 8 for judging collision by comparing level values of the frequency components obtained by conversion by the Hadamard-transforming unit 5 with the threshold data outputted from the threshold-outputting unit 6.

In this embodiment, the output signal from the acceleration sensor 1 is obtained as interval data waveforms outputted through interval windows each having a predetermined interval width of a plurality of sampling cycles and provided as those successively delayed by one sampling cycle respectively. The Hadamard-transforming unit 5 Hadamard-transforms the interval data waveform for each of the interval windows, and decomposes it into frequency components. The threshold-outputting unit 6 feeds threshold data established for each of predetermined frequency components corresponding to the vehicle. The collision-judging unit 8 compares the level value for each of the frequency components decomposed by the Hadamard-transforming unit 5 with the threshold data outputted from the threshold-outputting unit 6 so that an output of a judgment of occurrence of collision is fed if the level value of the frequency component is larger than the threshold data.

The output from the collision-judging unit 8 is supplied to the air bag-driving circuit 11. An air bag is inflated on the basis of the output from the collision-judging unit 8 outputted when the judgment of occurrence of collision is made.

At first, the Hadamard transform will be explained.

In general, a method for converting discrete time signals is available, wherein X and Y are given as column vectors comprising elements of N individuals of data and linear transformation coefficients thereof. The column vectors X and Y are represented by the following expressions (1), (2) respectively.

$$X = \begin{bmatrix} X(0) \\ X(1) \\ \vdots \\ X(N-1) \end{bmatrix} \quad (1)$$

$$Y = \begin{bmatrix} Y(0) \\ Y(1) \\ \vdots \\ Y(N-1) \end{bmatrix} \quad (2)$$

wherein X and Y are matrixes each having n rows and one column.

The both of X and Y can be expressed by linear transformation shown in the following expression (3) by using a transformation matrix A having N rows and N columns.

$$Y = AX \quad (3)$$

The Hadamard transform uses, as the transformation matrix A, a normalized matrix comprising elements of Walsh functions including only (1, −1). The Hadamard transform includes several types, however, this embodiment will be explained while limiting the Hadamard transform to the so-called standard type.

It is assumed that an Hadamard matrix having N rows and N columns is represented by [Hn]. A minimum Hadamard matrix is quadratic, which is given by the following expression (4).

$$[H_2] = \frac{1}{2}\begin{bmatrix} 1 & 1 \\ 1 & -1 \end{bmatrix} \quad (4)$$

A quartic Hadamard matrix $[H_4]$ is obtained by allowing $[h_2]$ to correspond to 1 and allowing $[-H_2]$ to correspond to −1 in the right side of the expression (4), which is given by the following expression (5).

$$[H_4] = \frac{1}{2}\begin{bmatrix} H_2 & H_2 \\ H_2 & -H_2 \end{bmatrix} \frac{1}{2}\begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad (5)$$

In the same manner as described above, an Hadamard matrix of degree eight $[H_8]$ is given by the following expression (6).

$$[H_8] = \frac{1}{2}\begin{bmatrix} H_4 & H_4 \\ H_4 & -H_4 \end{bmatrix} \quad (6)$$

$$= \frac{1}{2}\begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}$$

As described above, an Hadamard matrix of degree $2^n$ (n is a positive integer) is represented by a recurrence formula, and thus the degree of a transformation matrix can be increased in this manner. The Hadamard matrix is a square matrix in which all row vectors or column vectors are orthogonal with each other. The Fourier transform uses trigonometric functions as the orthogonal function, while the Hadamard transform uses Walsh functions.

As described above, each row of the Hadamard matrix is a Walsh function in the case of the Hadamard transfer, in the same manner as those represented by trigonometric functions in the case of the Fourier transform. The Walsh function has properties similar to those of the trigonometric function.

The order of respective rows in the Hadamard matrix is not coincident with the order of the frequency components in the row vector. A number of times, at which zero is traversed in the row vector, is referred to as "sequency". As for the Walsh function, ½ (round-up) of the number of times at which zero is traversed is referred to as "sequency". The sequency corresponds to the frequency of the trigonometric function.

Sequencies based on the former, corresponding to respective rows of the Hadamard matrix can be determined as follows. Explanation will be made as exemplified by the Hadamard matrix of degree eight with reference to Table 1.

TABLE 1

| Order | Expression by binary number | Bit conversion | Expression of sequency by binary number | Order of sequencies |
|---|---|---|---|---|
| 0 | 000 | 000 | 000 | 0 |
| 1 | 001 | 100 | 111 | 7 |
| 2 | 010 | 010 | 011 | 3 |
| 3 | 011 | 110 | 100 | 4 |
| 4 | 100 | 001 | 001 | 1 |
| 5 | 101 | 101 | 110 | 6 |
| 6 | 110 | 011 | 010 | 2 |
| 7 | 111 | 111 | 101 | 5 |

Now the contents of description in each column in Table 1 will be explained.

The column indicated by "Order" in Table 1 shows, by using a number from the top, the order of the row vectors of the Hadamard matrix. The column indicated by "Expression by binary number" in Table 1 expresses, by using a binary number, the number which indicates the order from the top of the row vectors of the Hadamard matrix. The column indicated by "Bit conversion" in Table 1 is obtained by sorting bits of the binary number described in the column of "Expression by binary number" in a last-come first-served order of the bits. The column indicated by "Expression of sequency by binary number" in Table 1 is obtained by describing a value of MSB of the binary number expressed in the column indicated by "Bit conversion", as a value of MSB as it is, describing a value which comes to MSB of the binary number expressed in the column indicated by "Expression of sequency by binary number" when it is subjected to exclusive OR operation together with a value of (MSB−1) of the binary number expressed in the column indicated by "Bit conversion", as a value of (MSB−1) in the column indicated by "Expression of sequency by binary number", and describing a value which comes to (MSB−1) of the binary number expressed in the column indicated by "Expression of sequency by binary number" when it is subjected to exclusive OR operation together with a value of (MSB−2=LSB) of the binary number expressed in the column indicated by "Bit conversion", as a value of (MSB−2=LSB) in the column indicated by "Expression of sequency by binary number". The column indicated by "Order of sequencies" in Table 1 is expressed by converting the binary number described in the column indicated by "Expression of sequency by binary number" into a decimal number.

When the order of sequencies is determined, the transformation from those of "Bit conversion" into those of "Expression of sequency by binary number" can be performed in accordance with operations based on the following expressions (7) and (8).

$$bL = gL \quad (7)$$

$$bk+1 = gk \oplus bk \quad (8)$$

In the expressions (7) and (8), each of the bits of the binary number except for MSB in the column indicated by "Bit conversion" is represented by gk (k is 1, 2, ..., L−1), and MSB is represented by gL. Each of the bits of the binary number except for MSB in the column indicated by "Expression of sequency by binary number" is represented by bk (k is 1, 2, ..., L−1), and MSB is represented by bL. In the expression (8), the symbol composed of "+" depicted in a circle indicates exclusive OR.

According to the foregoing operation, it is possible to know the order of sequencies with respect to the order of the row vectors of the Hadamard matrix. Accordingly, results of the Hadamard transform Y(0) to Y(7) of the data array x(0) to x(7) are determined as shown in FIG. 2 by using the expression (6). In FIG. 2, those depicted in the right side are arranged in accordance with the sequence or order of sequencies. The coefficient (½), which is commonly multiplied in the expressions (4) to (6), is neglected.

The results of the Hadamard transform shown in FIG. 2 are represented by the following expressions (9-1) to (9-8).

$$Y(0)=X(0)+X(1)+X(2)+X(3)+X(4)+X(5)+X(6)+X(7) \quad (9\text{-}1)$$

$$Y(7)=X(0)-X(1)+X(2)-X(3)+X(4)-X(5)+X(6)-X(7) \quad (9\text{-}2)$$

$$Y(3)=X(0)+X(1)-X(2)-X(3)+X(4)+X(5)-X(6)-X(7) \quad (9\text{-}3)$$

$$Y(4)=X(0)-X(1)-X(2)+X(3)+X(4)-X(5)-X(6)+X(7) \quad (9\text{-}4)$$

$$Y(1)=X(0)+X(1)+X(2)+X(3)-X(4)-X(5)-X(6)-X(7) \quad (9\text{-}5)$$

$$Y(6)=X(0)-X(1)+X(2)-X(3)-X(4)+X(5)-X(6)+X(7) \quad (9\text{-}6)$$

$$Y(2)=X(0)+X(1)-X(2)-X(3)-X(4)-X(5)+X(6)+X(7) \quad (9\text{-}7)$$

$$Y(5)=X(0)-X(1)-X(2)+X(3)-X(4)+X(5)+X(6)-X(7) \quad (9\text{-}8)$$

The expressions (9-1) to (9-8) involve an order of sequencies, in which the frequency is successively increased starting from the expression (9-1) to the expressions (9-5), (9-7), (9-3), (9-4), (9-8), (9-6), and (9-2). Y(0) represents a direct current component (or amount of change in velocity per unit time in the case of collision G of a body). Y(1) represents a component corresponding to a sine wave of a frequency which follows the direct current component. Y(2) represents a component corresponding to a cosine wave of a frequency which follows the direct current component. Higher frequency components are given in accordance with migration to Y(3), Y(4), Y(5), Y(6), and Y(7). Each of values of Y(0) to Y(7) corresponds to a level value of the frequency component.

As clarified from the expressions (9-1) to (9-8) described above, the frequency analysis by using the Hadamard transform is based on the operation which can be performed by using only addition and subtraction. Accordingly, the operation processing can be performed at a high speed. As a result, it is unnecessary to use a high-speed digital signal processor which would be otherwise required for the conventional Fourier transform.

Based on the foregoing explanation, the judgment on vehicle collision in accordance with this embodiment will be explained.

The output signal from the acceleration sensor, which is inputted through the filter 2, is converted into 16-bit data in the A/D-converting unit 3. The converted 16-bit data are subjected to conversion processing on the basis of an acceleration of zero in the acceleration data processing unit 4. The 16-bit data subjected to the acceleration conversion processing are Hadamard–transformed with a Hadamark matrix of degree sixteen in the Hadamard-transforming unit 5, and decomposed into frequency components.

The Hadamard matrix of degree sixteen $[H_{16}]$ is given by the following expression (10).

$$[H_{16}] = \frac{1}{2}\begin{bmatrix} 1 & 1 & -1 & 1 & 1 & 1 & 1 & 1 & 1 & 1 & 1 & 1 & 1 & 1 & 1 & 1 \\ 1 & -1 & -1 & -1 & 1 & -1 & 1 & -1 & 1 & -1 & 1 & -1 & 1 & -1 & 1 & -1 \\ 1 & 1 & 1 & -1 & 1 & 1 & -1 & -1 & 1 & 1 & -1 & -1 & 1 & 1 & -1 & -1 \\ 1 & -1 & -1 & 1 & 1 & -1 & -1 & 1 & 1 & -1 & -1 & 1 & 1 & -1 & -1 & 1 \\ 1 & 1 & -1 & 1 & -1 & -1 & -1 & -1 & 1 & 1 & 1 & 1 & -1 & -1 & -1 & -1 \\ 1 & -1 & 1 & -1 & -1 & 1 & -1 & 1 & 1 & -1 & 1 & -1 & -1 & 1 & -1 & 1 \\ 1 & 1 & -1 & -1 & -1 & -1 & 1 & 1 & 1 & 1 & -1 & -1 & -1 & -1 & 1 & 1 \\ 1 & -1 & -1 & 1 & -1 & 1 & 1 & -1 & 1 & -1 & -1 & 1 & -1 & 1 & 1 & -1 \\ 1 & 1 & 1 & 1 & 1 & 1 & 1 & 1 & -1 & -1 & -1 & -1 & -1 & -1 & -1 & -1 \\ 1 & -1 & 1 & -1 & 1 & -1 & 1 & -1 & -1 & 1 & -1 & 1 & -1 & 1 & -1 & 1 \\ 1 & 1 & -1 & -1 & 1 & 1 & -1 & -1 & -1 & -1 & 1 & 1 & -1 & -1 & 1 & 1 \\ 1 & -1 & -1 & 1 & 1 & -1 & -1 & 1 & -1 & 1 & 1 & -1 & -1 & 1 & 1 & -1 \\ 1 & 1 & 1 & 1 & -1 & -1 & -1 & -1 & -1 & -1 & -1 & -1 & 1 & 1 & 1 & 1 \\ 1 & -1 & 1 & -1 & -1 & 1 & -1 & 1 & -1 & 1 & -1 & 1 & 1 & -1 & 1 & -1 \\ 1 & 1 & -1 & 1 & -1 & -1 & 1 & 1 & -1 & -1 & 1 & 1 & 1 & -1 & -1 \\ 1 & -1 & -1 & 1 & -1 & 1 & 1 & -1 & -1 & 1 & 1 & -1 & 1 & -1 & -1 & 1 \end{bmatrix} \quad (10)$$

Results of the Hadamard transform with the Hadamard matrix of degree sixteen are represented by the following expressions (11-1) to (11-16).

$Y(0)=X(0)+X(1)+X(2)+X(3)+X(4)+X(5)+X(6)+X(7)+X(8)+X(9)+X(10)+X(11)+X(12)+X(13)+X(14)+X(15)$ (11-1)

$Y(15)=X(0)-X(1)+X(2)-X(3)+X(4)-X(5)+X(6)-X(7)+X(8)-X(9)+X(10)-X(11)+X(12)-X(13)+X(14)-X(15)$ (11-2)

$Y(7)=X(0)+X(1)-X(2)-X(3)+X(4)+X(5)-X(6)-X(7)+X(8)+X(9)-X(10)-X(11)+X(12)+X(13)-X(14)-X(15)$ (11-3)

$Y(8)=X(0)-X(1)-X(2)+X(3)+X(4)-X(5)-X(6)+X(7)+X(8)-X(9)-X(10)+X(11)+X(12)-X(13)-X(14)+X(15)$ (11-4)

$Y(3)=X(0)+X(1)+X(2)+X(3)-X(4)-X(5)-X(6)-X(7)+X(8)+X(9)+X(10)+X(11)-X(12)-X(13)-X(14)-X(15)$ (11-5)

$Y(12)=X(0)-X(1)+X(2)-X(3)-X(4)+X(5)-X(6)+X(7)+X(8)-X(9)+X(10)-X(11)-X(12)+X(13)-X(14)+X(15)$ (11-6)

$Y(4)=X(0)+X(1)-X(2)-X(3)-X(4)-X(5)+X(6)+X(7)+X(8)+X(9)-X(10)-X(11)-X(12)-X(13)+X(14)+X(15)$ (11-7)

$Y(11)=X(0)-X(1)-X(2)+X(3)-X(4)+X(5)+X(6)-X(7)+X(8)-X(9)-X(10)+X(11)-X(12)+X(13)+X(14)-X(15)$ (11-8)

$Y(1)=X(0)+X(1)+X(2)+X(3)+X(4)+X(5)+X(6)+X(7)-X(8)-X(9)-X(10)-X(11)-X(12)-X(13)-X(14)-X(15)$ (11-9)

$Y(14)=X(0)-X(1)+X(2)-X(3)+X(4)-X(5)+X(6)-X(7)-X(8)+X(9)-X(10)+X(11)-X(12)+X(13)-X(14)+X(15)$ (11-10)

$Y(6)=X(0)+X(1)-X(2)-X(3)+X(4)+X(5)-X(6)-X(7)-X(8)-X(9)+X(10)+X(11)-X(12)-X(13)+X(14)+X(15)$ (11-11)

$Y(9)=X(0)-X(1)-X(2)+X(3)+X(4)-X(5)-X(6)+X(7)-X(8)+X(9)+X(10)-X(11)-X(12)+X(13)+X(14)-X(15)$ (11-12)

$Y(2)=X(0)+X(1)+X(2)+X(3)-X(4)-X(5)-X(6)-X(7)-X(8)-X(9)-X(10)-X(11)+X(12)+X(13)+X(14)+X(15)$ (11-13)

$Y(13)=X(0)-X(1)+X(2)-X(3)-X(4)+X(5)-X(6)+X(7)-X(8)+X(9)-X(10)+X(11)+X(12)-X(13)+X(14)-X(15)$ (11-14)

$Y(5)=X(0)+X(1)-X(2)-X(3)-X(4)-X(5)+X(6)+X(7)-X(8)-X(9)+X(10)+X(11)+X(12)+X(13)-X(14)-X(15)$ (11-15)

$Y(10)=X(0)-X(1)-X(2)+X(3)-X(4)+X(5)+X(6)-X(7)-X(8)+X(9)+X(10)-X(11)+X(12)-X(13)-X(14)+X(15)$ (11-16)

In the foregoing, the order of sequencies is Y(0), Y(1) to Y(15).

Next, the Hadamard transform will be specifically explained.

The output data from the A/D-converting unit 3, having a time width of 16 sampling cycles and outputted through the interval windows each of which is successively delayed by one sampling cycle, are subjected to the acceleration conversion processing in the acceleration data processing unit 4. The output data from the acceleration data processing unit 4 are decomposed into frequencies by means of the Hadamard transform. Namely, a data array X(k) (k=0 to 15) corresponding to continuous 16 samples is used as one block. Thus a data array Y(k) (k=0 to 15) subjected to the frequency decomposition by means of the Hadamard transform of degree sixteen is obtained.

The level value of the frequency component is hereinafter referred to as "Hadamard transform data (K)" or "level value of the frequency component (K)", if necessary.

Next, an amount of data corresponding to continuous 16 samples delayed by one sampling cycle is used as one block to perform decomposition into frequency components by using the Hadamard matrix of degree sixteen. The operation is successively repeated in the same manner as described above. The level values of the frequency components obtained by the Hadamard transform are used as collision judgment data to be subjected to the judgment on collision as separately described herein.

States of the frequency decomposition based on the Hadamard transform will be explained with reference to FIGS. 3A to 3C, FIGS. 4A to 4C, and FIGS. 5A to 5C.

FIGS. 3A to 3C schematically show relationships between interval windows and the waveform of the output signal from the acceleration sensor 1 supplied through the acceleration data processing unit 4 to the Hadamard–transforming unit 5. FIG. 3A shows an interval window having a time width of 16 sampling cycles on the basis of the start of the judgment on collision. An interval window shown in FIG. 3B is delayed by one sampling cycle from the interval window shown in FIG. 3A. An interval window shown in FIG. 3C is delayed by 15 sampling cycles from the interval window shown in FIG. 3A.

FIGS. 4A, 4B, and 4C correspond to FIGS. 3A, 3B, and 3C respectively, each illustrating an output signal waveform from the acceleration sensor corresponding to one block to be subjected to the Hadamard transform.

Figure 5C:
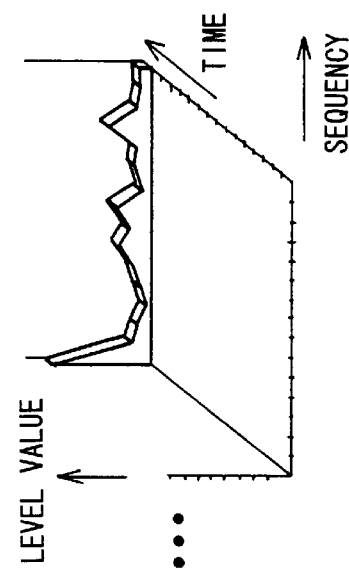
FIG. 5C corresponds to FIG. 4C, explanatorily illustrating level values of respective frequency components obtained by frequency decomposition of the waveform contained in the interval window shown in FIG. 3C.
Figure 5B:
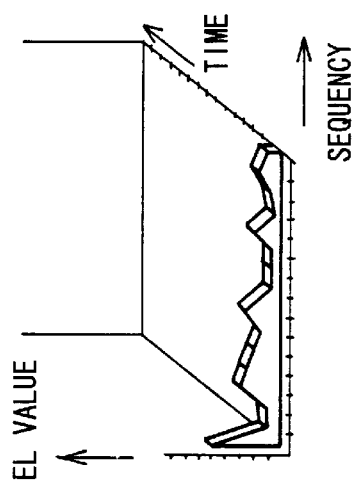
FIG. 5B corresponds to FIG. 4B, explanatorily illustrating level values of respective frequency components obtained by frequency decomposition of the waveform contained in the interval window shown in FIG. 3B.
Figure 5A:
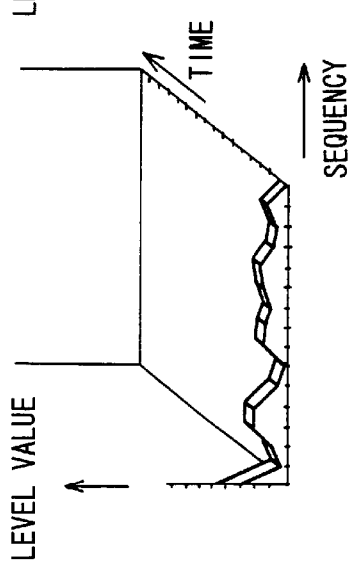
FIG. 5A corresponds to FIG. 4A, explanatorily illustrating level values of respective frequency components obtained by frequency decomposition of the waveform contained in the interval window shown in FIG. 3A.
Figure 6:
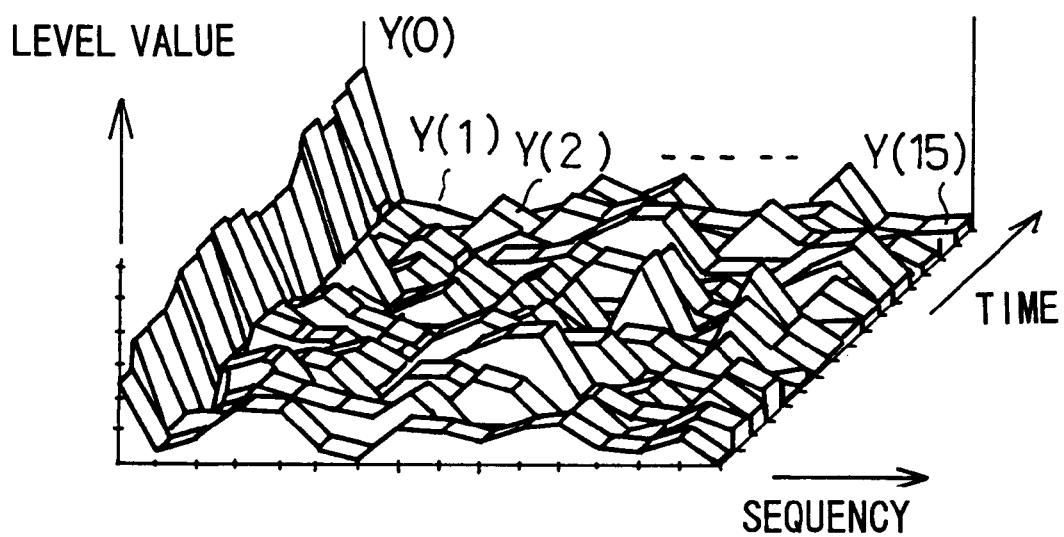

FIGS. 5A, 5B, and 5C correspond to FIGS. 4A, 4B, and 4C respectively, each illustrating level values of respective frequency components obtained by frequency-decomposing the waveforms contained in the interval windows shown in FIG. 3A, FIG. 3B, and FIG. 3C, and arranging obtained results in an order of frequencies. When the level values are illustrated by aligning them in the direction of the axis of time, an order of sequencies of Y(0), Y(1), . . . Y(15) is obtained as shown in FIG. 6.

Next, the judgment on collision will be explained. FIG. 7A shows a waveform of an output signal from the acceleration sensor 1 obtained when the vehicle encounters collision in the first embodiment. A judgment of occurrence of collision must be made within a time T from the start of collision.

Figure 7B:
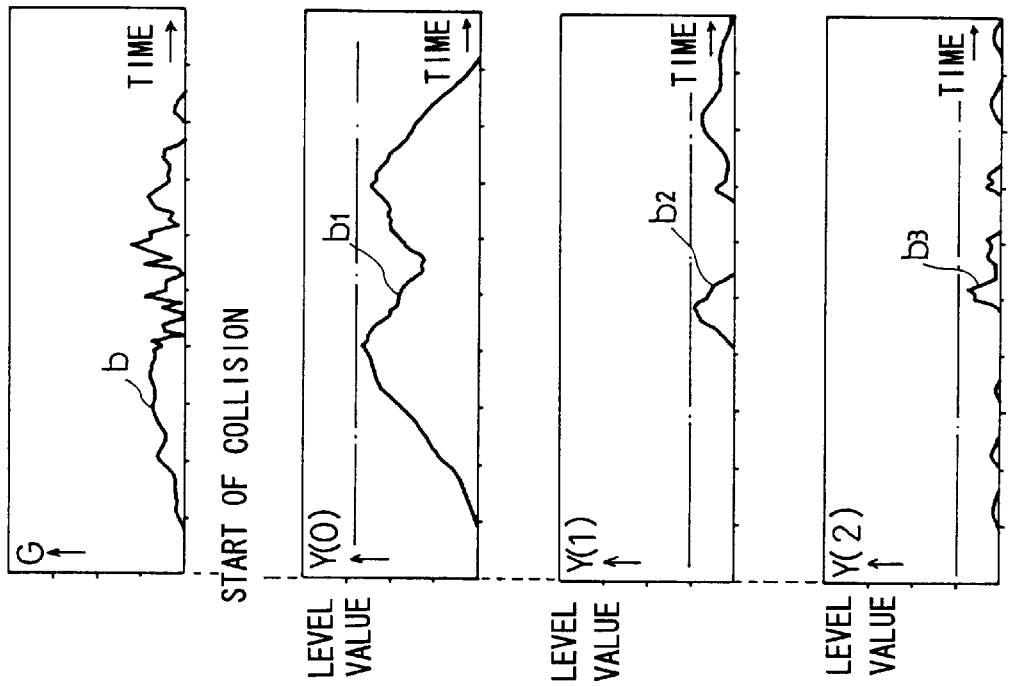
FIG. 7B schematically shows waveforms to be used to explain a case of no occurrence of collision in the first embodiment of the method for judging vehicle collision according to the present invention, illustrating an output from the acceleration sensor and frequency components of Y(0) to Y(2).
Figure 7A:
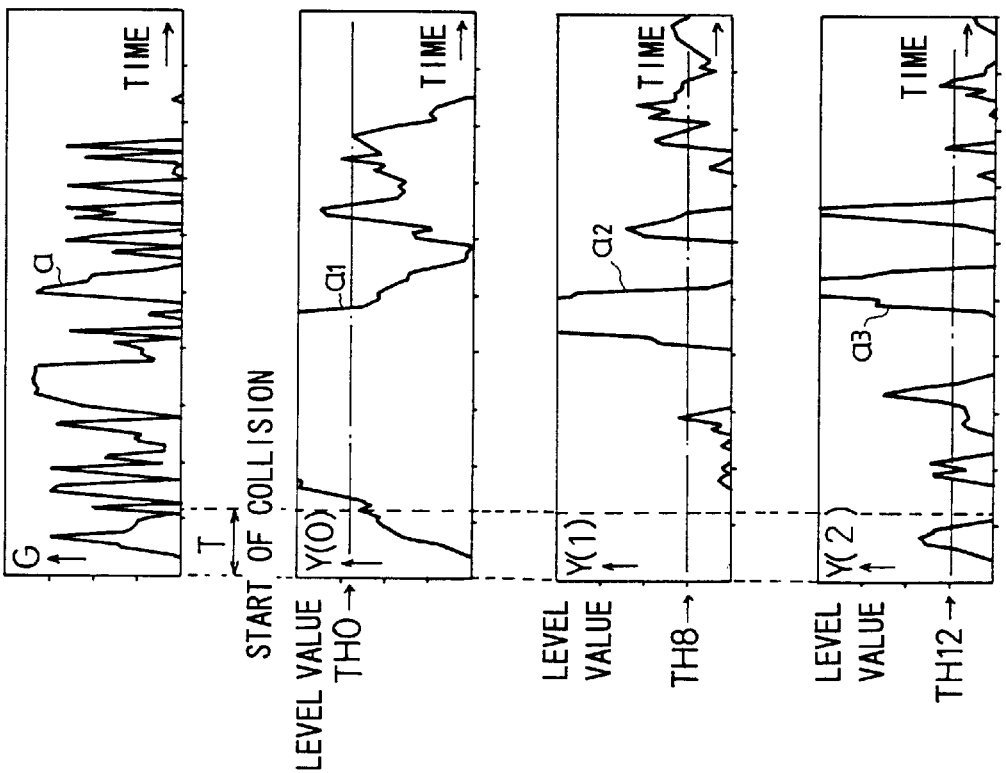
FIG. 7A schematically shows waveforms to be used to explain a judgment on collision in the first embodiment of the method for judging vehicle collision according to the present invention, illustrating an output from the acceleration sensor and frequency components of Y(0) to Y(2).
Figure 8A:
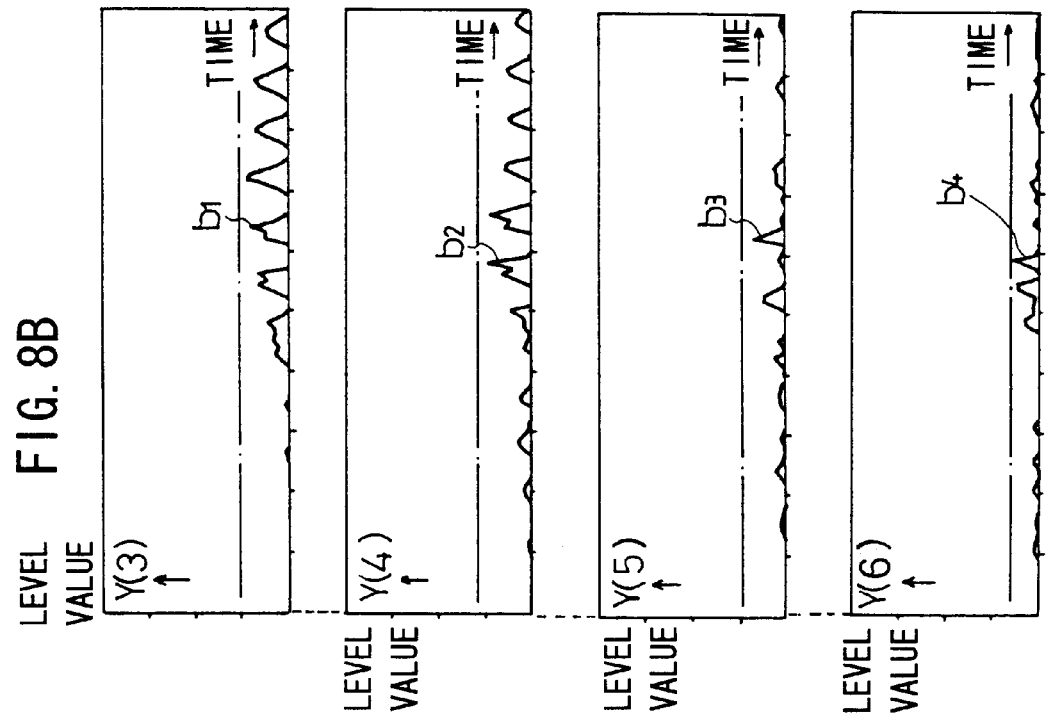
FIG. 8A schematically shows waveforms to be used to explain the judgment on collision in the first embodiment of the method for judging vehicle collision according to the present invention, illustrating frequency components of Y(3) to Y(6).

The waveform of the output signal from the acceleration sensor 1 shown in FIG. 7A is subjected to frequency decomposition with the Hadamard matrix of degree sixteen to obtain results of conversion. Among them, seven level values of frequency components ranging from those having lower frequencies {respective values of Y(0) to Y(6)} are shown by waveforms a1 to a3 in FIG. 7A and waveforms a1 to a4 in FIG. 8A. Namely, the waveforms a1 to a3 in FIG. 7A and the waveforms a1 to a4 in FIG. 8A represent the respective level values of Y(0) to Y(6) in the direction of the axis of time in FIG. 6.

On the other hand, the threshold-outputting unit 6 previously stores thresholds TH(0) to TH(6) for the frequency components corresponding to Y(0) to Y(6) as specified for the vehicle. The corresponding thresholds TH(0) to TH(6) are compared by the collision-judging unit 8 with the corresponding level values of the frequency components, i.e., the values of Y(0) to Y(6) respectively. If the level value of the frequency component is not less than the threshold, a judgment of occurrence of vehicle collision is made.

On the other hand, a waveform b shown in FIG. 7B represents a waveform of an output signal from the acceleration sensor 1 obtained when the vehicle does not encounter collision in this embodiment, for example, when the vehicle runs on to the sidewalk.

Figure 8B:
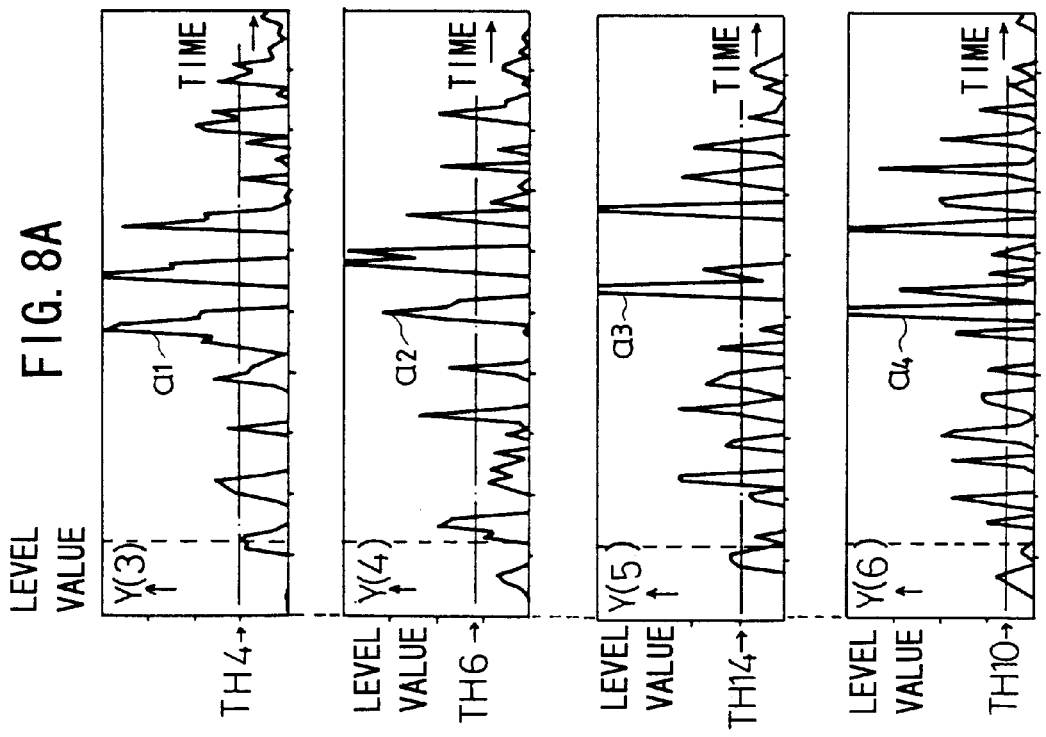
FIG. 8B schematically shows waveforms to be used to explain the case of no occurrence of collision in the first embodiment of the method for judging vehicle collision according to the present invention, illustrating frequency components of Y(3) to Y(6).

The waveform of the output signal from the acceleration sensor 1 shown in FIG. 7B is also subjected to frequency decomposition with the Hadamard matrix of degree sixteen to obtain results of conversion. Among them, seven level values of frequency components ranging from those having lower frequencies {respective values of Y(0) to Y(6)} are shown by waveforms b1 to b3 in FIG. 7B and waveforms b1 to b4 in FIG. 8B. The waveforms b1 to b3 in FIG. 7B and the waveforms b1 to b4 in FIG. 8B are obtained in the same manner as the waveforms a1 to a3 in FIG. 7A and the waveforms a1 to a4 in FIG. 8A.

The corresponding thresholds TH(0) to TH(6) are compared with the level values of the frequency components obtained for the waveform of the output signal from the acceleration sensor 1 shown as the waveform b in FIG. 7B, i.e., the values of Y(0) to Y(6). If the level value of the frequency component is not less than the threshold, a judgment of occurrence of vehicle collision is made.

Results of the foregoing judgment are shown in the following Table 2.

TABLE 2

| Level value of frequency component | Waveform of collision (see FIG. 7A) | Waveform of no collision see FIG. 7B) |
| --- | --- | --- |
| Y (0) | delay* | off |
| Y (1) | delay* | off |
| Y (2) | on | off |
| Y (3) | delay* | off |
| Y (4) | delay* | off |
| Y (5) | on | off |
| Y (6) | on | off | delay*: delay in judgment on collision

In Table 2, the indication of "on" represents that a judgment of occurrence of collision is made within the time T. The indication of "off" represents that there is no portion which exceeds the threshold, and no judgment of occurrence of collision is made. Accordingly, it is understood that the judgment standard concerning collision is satisfied by the values of Y(2), Y(5), and Y(6) in relation to the vehicle described above.

Therefore, in the case of the vehicle described above, the following operations may be satisfactory. Namely, the thresholds of TH(2), TH(5), and TH(6) are set in the threshold-outputting unit 6. The values of Y(2), Y(5), and Y(6) are outputted from the Hadamard-transforming unit 5. Thus the collision-judging unit 8 is used to compare the thresholds TH(2), TH(5), and TH(6) with the values of Y(2), Y(5), and Y(6).

According to the first embodiment of the present invention, the output signal waveform from the acceleration sensor 1 is decomposed into the frequency components by means of the Hadamard transform. Characteristics of the waveform of collision are substantially extracted from the obtained results to make a judgment on collision. Accordingly, no erroneous judgment is made when the judgment of occurrence or no occurrence of collision is made. Moreover, the decomposition into the frequency components is performed by means of the Hadamard transform. Therefore, only operations of addition and subtraction are required for the decomposition into the frequency components. If the decomposition into the frequency components is performed at the same speed as that achieved by the conventional method, the judgment on collision can be made without using any digital signal processor for performing high-speed operation processing which would be otherwise required for the conventional method.

Figure 9:
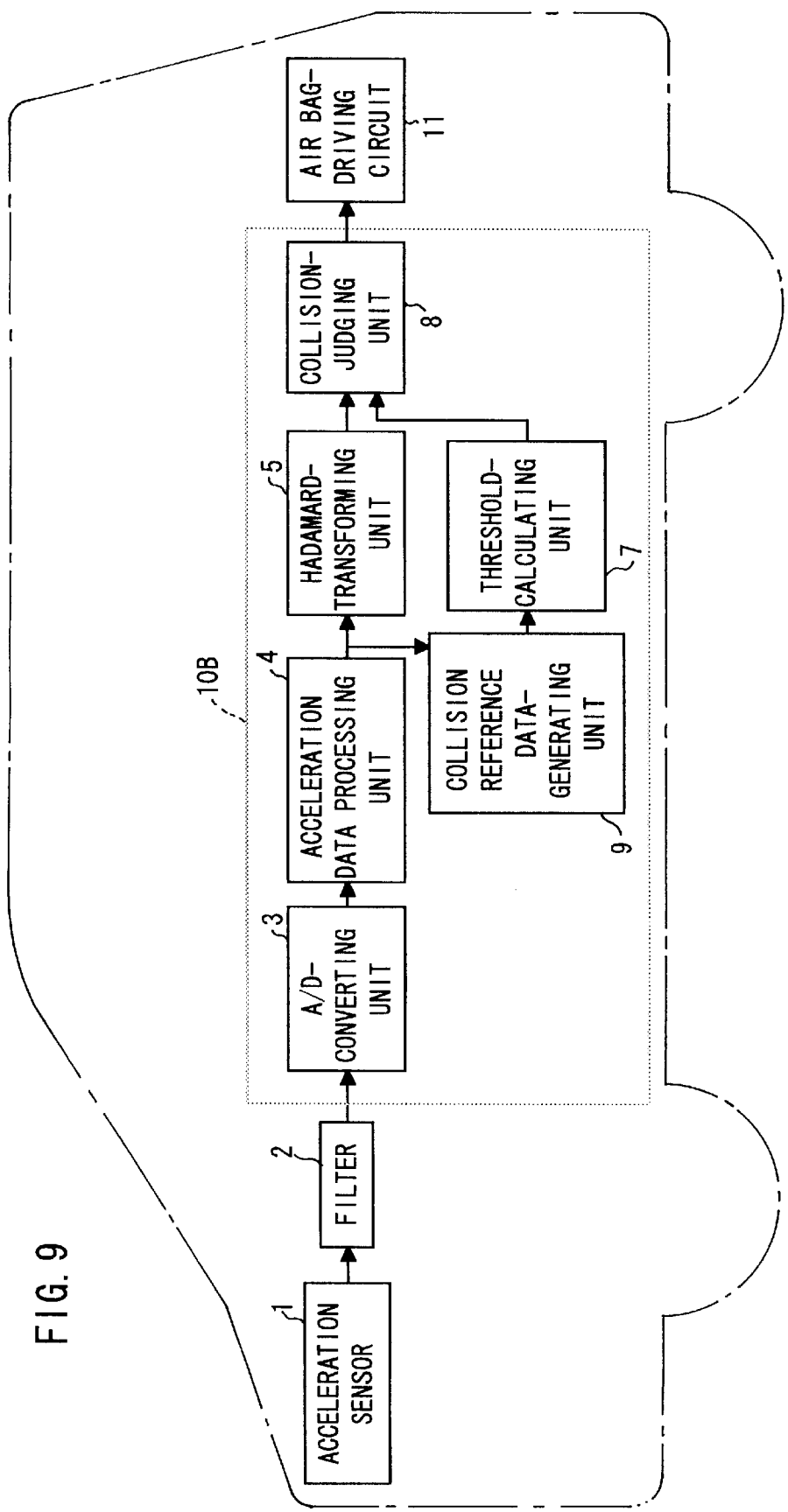
FIG. 9 shows a block diagram illustrating a system of an embodiment of a collision-judging apparatus to which a second embodiment of the method for judging vehicle collision according to the present invention is applied.

FIG. 9 shows a block diagram illustrating a system of an embodiment of an apparatus to which a second embodiment of the method for judging vehicle collision according to the present invention is applied.

An acceleration sensor 1, a filter 2, a microcomputer 10B, and an air bag-driving circuit 11 are carried on a vehicle shown with chain lines in FIG. 9.

An output signal from the acceleration sensor 1 is supplied to the filter 2 provided to avoid aliasing. An output from the filter 2 is supplied to the microcomputer 10B.

The microcomputer 10B comprises functions of an A/D-converting unit 3 for inputting the output from the filter 2 thereinto and converting the output from the filter 2 into digital data, an acceleration data processing unit 4 for receiving the digital data obtained by conversion by the A/D-converting unit 3 and performing conversion processing such as application of a bias value to set a value of the digital data corresponding to an acceleration of zero, an Hadamard-transforming unit 5 for Hadamard-transforming an output from the acceleration data processing unit 4 to decompose it into frequency components, a collision reference data-generating unit 9 for generating collision reference data on the basis of the output from the acceleration data processing unit 4, a threshold-calculating unit 7 for calculating a collision judgment threshold on the basis of a value of the collision reference data generated by the collision reference data-generating unit 9, and a collision-judging unit 8 for comparing level values of the frequency components as collision judgment data obtained by conversion by the Hadamard-transforming unit 5 with the collision judgment threshold calculated by the threshold-calculating unit 7 so that a judgment of occurrence of collision is made if the level value as the collision judgment data exceeds the collision judgment threshold.

The output from the collision-judging unit 8 is supplied to the air bag-driving circuit 11. An air bag is inflated on the basis of an output from the collision-judging unit 8 outputted when the judgment of occurrence of collision is made.

The same processing as those performed in the first embodiment of the method for judging vehicle collision according to the present invention is performed for the processing of acceleration conversion in the acceleration data processing unit 4 and the processing of Hadamard transform in the Hadamard-transforming unit 5, as explained with reference to FIGS. 2, 3A to 3C, 4A to 4C, 5A to 5C, and 6. Therefore, explanation for these processings is omitted in order to avoid repetition. Explanation will be successively made for the processing for generating the collision reference data performed in the collision reference data-generating unit 9, the processing for calculating the threshold performed in the threshold-calculating unit 7, and the processing for judging collision performed in the collision-judging unit 8.

Waveforms a, b in FIGS. 10A and 10B represent waveforms of the output signal from the acceleration sensor 1 in the second embodiment of the present invention.

The waveform of the output signal from the acceleration sensor 1 indicated by the symbol a in FIG. 10A is a waveform of the output signal from the acceleration sensor 1 obtained when the vehicle encounters collision. A judgment of occurrence of collision must be made within a time T from the start of collision. The waveform of the output signal from the acceleration sensor 1 indicated by the symbol a in FIG. 10A is subjected to frequency decomposition with the Hadamard matrix of degree sixteen to obtain results of conversion. Among them, five level values of frequency components ranging from those having lower frequencies to those having higher frequencies (respective values of Y(0) to Y(4)) are shown as waveforms a1 to a2 in FIG. 10A and waveforms a1 to a3 in FIG. 11A. Namely, the waveforms a1 to a2 in FIG. 10A and the waveforms a1 to a3 in FIG. 11A represent the respective values of the level values Y(0) to Y(4) of the frequency components given in the direction of the axis of time in FIG. 6.

On the other hand, a waveform of an output signal from the acceleration sensor 1, which is obtained when the vehicle should be judged to have no collision, for example, when the vehicle runs on to the sidewalk, is shown by a waveform b in FIG. 10B.

The waveform of the output signal from the acceleration sensor 1 shown by the waveform b in FIG. 10B is also subjected to frequency decomposition with the Hadamard matrix of degree sixteen to obtain results of conversion. Among them, five level values of frequency components ranging from those having lower frequencies (respective values of Y(0), Y(1), Y(2), Y(3), Y(4)) are shown by waveforms b1 to b2 in FIG. 10B and waveforms b1 to b3 in FIG. 11B. The waveforms b1 to b2 in FIG. 10B and the waveforms b1 to b3 in FIG. 11B are obtained in the same manner as the waveforms a1 to a2 in FIG. 10A and the waveforms a1 to a3 in FIG. 11A.

This embodiment uses, as the collision judgment data, the level value Y(2) of the frequency component selected from the level values of the frequency components.

Next, the processing for generating the collision reference data performed by the collision reference data-generating unit 6 will be explained.

An interval integral value, an infinite integral value, and a difference value in interval integral are computed from the acceleration signal waveform based on the data outputted from the acceleration data processing unit 4 respectively.

The interval integral value is obtained in accordance with operation shown in the following expressions (12-1), (12-2).

$$\text{interval integral value} = \int_{t-w}^{t} G(t)dt \qquad (12\text{-}1)$$

$$\text{interval integral value} = \sum_{j=t-w}^{t} Gj \qquad (12\text{-}2)$$

The expression (12-1) is represented by a form of analog signal. G(t) represents the output signal from the acceleration sensor 1, and a result is obtained by integration from a present time t over an interval of a constant time width shown by w. The constant time width W corresponds to, for example, the time interval of the interval window shown in FIG. 3. Further, it is assumed that the sampling cycle is Δt. Integration is performed from a time (t+Δt) successively deviated by one sampling cycle over the interval of the constant time width w. Next, in the same manner as described above, integration is performed over the interval corresponding to FIGS. 3A, 3B, 3C with each deviation of one sampling cycle Δt to determine interval integral values.

Of course, the operation performed in the collision reference data-generating unit 9 is operation based on the use of discrete values, which may be represented, for example, by the expression (12-2). . . . As also clarified from the expression (12-2), the expressions (12-1), (12-2), . . . correspond to the time width of the interval window shown in FIG. 3 in this embodiment.

The level value Y(0) of the frequency component may be used as the interval integral value, instead of the interval integral value based on the expressions (12-1), (12-2).

Next, the infinite integral value is obtained by successively adding acceleration values starting from the sampling start time=0 for the output signal from the acceleration sensor 1. The infinite integral value is determined in accordance with operation shown in the following expressions (13-1), (13-2). In this second embodiment, in order to remove any amount of offset generated due to dispersion of the acceleration sensor 1, a value obtained by subtraction of an amount of 1G is used. If the infinite integral value is less than zero, zero is used as an infinite integral value. As for the term "infinite integral" used herein, the infinite integral is referred to because no time interval for integration is limited, as compared with the interval integral.

$$\text{infinite integral value} = \int_{t-w}^{t} (G(t)-1)dt \qquad (13\text{-}1)$$

$$\text{infinite integral value} = \sum_{j=0}^{t} (Gj - 1) \qquad (13\text{-}2)$$

The expression (13-1) is expressed in an analog form, while the expression (13-2) is expressed for discrete values.

Further, the difference value in interval integral is determined as shown in the following expressions (14-1), (14-2). Namely, the difference value is obtained by computing a value of difference between a first interval integral value obtained by integration from a present time t over an interval of a constant time width $w_1$ and a second interval integral value obtained by integration from a certain time $t_{-w1-1}$ over an interval of a constant time width $w_2$. In this procedure, the time widths $w_1$ and $w_2$ may have an identical value.

$$\text{difference value in interval integral} = \int_{t-w_1}^{t} G(t)dt - \int_{t-w_2}^{t-w_1} G(t)dt \qquad (14\text{-}1)$$

$$\text{difference value in interval integral} = \sum_{j=t-w_1}^{t} Gj - \sum_{j=t-w_2}^{t-w_1-1} Gj \qquad (14\text{-}2)$$

The expression (14-1) is expressed in an analog form, while the expression (14-2) is expressed for discrete values.

The interval integral value, which is obtained in accordance with the operation described above for the output signal from the acceleration sensor 1 shown by a waveform a in FIG. 12, is shown by a waveform b in FIG. 12. The infinite integral value is shown by a waveform c in FIG. 12, and the difference value in interval integral is shown by a waveform d in FIG. 12. The waveform a in FIG. 12 is the same as the waveform a in FIG. 10A. Any one of the interval integral value, the infinite integral value, and the difference value in interval integral can be used as the collision reference data.

Next, a method for judging collision based on the use of the collision reference data and the collision judgment data will be explained.

In this embodiment, the difference value in interval integral is used as the value of collision reference data, the level value Y(2) of the frequency component is used as the value of the collision judgment data, three levels of collision judgment thresholds TH1 to TH3 (TH1<TH2<TH3) are provided, and three levels of collision reference thresholds SW1 to SW3 (SW1<SW2<SW3) are provided.

At first, the processing for calculating the collision judgment threshold in the collision-calculating unit 7 and the judgment on collision will be explained with reference to FIGS. 13, 14A, and 14B.

In a collision reference threshold-calculating routine, it is checked whether or not the value of the collision reference data exceeds the lower limit collision reference threshold SW1 (step S1). If it is judged in the step S1 that the value of the collision reference data is less than the lower limit collision reference threshold (SW1), the upper limit collision judgment threshold TH3 is set (step S2) after the step S1. If the step S2 is executed, the value of the collision reference data is less than the lower limit collision reference threshold. Accordingly, the upper limit collision judgment threshold TH3, which is located on a side of no occurrence of collision, is set.

If it is judged in the step S1 that the value of the collision reference data exceeds the lower limit collision reference threshold SW1, it is checked after the step S1 whether or not the value of the collision reference data exceeds the intermediate collision reference threshold SW2 (step S3). If it is judged in the step S3 that the value of the collision reference data is less than the intermediate collision reference threshold SW2, it is checked whether or not the previous collision judgment threshold is the upper limit collision judgment threshold TH3 (step S4).

If it is judged in the step 4 that the previous collision judgment threshold is the upper limit collision judgment threshold TH3, the step 2 is executed after the step S4. Namely, the setting of the upper limit collision judgment threshold TH3 is maintained (step S2).

If it is judged in the step 4 that the previous collision judgment threshold is not the upper limit collision judgment threshold TH3, the intermediate collision judgment threshold TH2 is set (step S5) after the step S4.

If it is judged in the step S3 that the value of the collision reference data exceeds the intermediate collision reference threshold SW2, it is checked after the step S3 whether or not the value of the collision reference data exceeds the upper limit collision reference threshold SW3 (step S6). If it is judged in the step S6 that the value of the collision reference data is less than the upper limit collision reference threshold SW3, it is checked after the step S6 whether or not the previous collision judgment threshold is the lower limit collision judgment threshold TH1 (step S7).

If it is judged in the step S7 that the previous collision judgment threshold is not the lower limit collision judgment threshold TH1, the step S5 is executed after the step S7. Namely, the intermediate collision judgment threshold TH2 is set as the collision judgment threshold (step S5).

If it is judged in the step S6 that the value of the collision reference data exceeds the upper limit collision reference threshold SW3, the lower limit collision judgment threshold TH1 is set (step S8) after the step S6. If it is judged in the step S7 that the previous collision judgment threshold is the lower limit collision judgment threshold TH1, the step S8 is executed after the step S7, and the lower limit collision judgment threshold TH1 is set as the collision judgment threshold.

As described above, the collision judgment threshold is selected on the basis of the value of the collision reference data and the collision reference threshold. Execution of the steps S4 and S7 delays decrease in the collision judgment threshold when the value of the collision reference data is apt to increase. Execution of the steps S4 and S7 also delays increase in the collision judgment threshold when the value of the collision reference data is apt to decrease. Accordingly, an effect is obtained, which is equivalent to those obtained by allowing the collision judgment threshold to have hysteresis.

States of selection of the collision judgment threshold, which are brought about by the execution of the respective steps shown in the flow chart in FIG. 13, are shown in FIGS. 14A and 14B. Waveforms a, b in FIG. 14A concern the waveform of the output signal from the acceleration sensor 1 in the case of the judgment that collision occurs. Waveforms a1, b1 in FIG. 14B concern the waveform of the output signal from the acceleration sensor 1 in the case of the judgment that collision does not occur.

The waveform a in FIG. 14A is obtained by adding the collision reference thresholds SW1 to SW3 to the drawing of the difference value in interval integral represented by the waveform d in FIG. 12. The waveform b in FIG. 14A is obtained by adding the collision judgment thresholds TH1 to TH3 selected on the basis of the collision reference threshold, to the drawing of the collision judgment data represented by the waveform a1 in FIG. 11A.

If the value of the collision reference data exceeds the collision reference threshold established as described above, the collision-judging unit 8 judges that collision occurs. Thus the air bag is inflated.

On the other hand, the waveform a1 in FIG. 14B is obtained by adding the collision reference thresholds SW1 to SW3 to the drawing of the difference value in interval integral based on the output signal waveform from the acceleration sensor 1, represented by the waveform b in FIG. 10B. The waveform b1 in FIG. 14B is obtained by adding the collision judgment thresholds TH1 to TH3 selected on the basis of the collision reference data shown by the waveform a1 in FIG. 14B, to the drawing of the collision judgment data represented by the waveform b1 in FIG. 11B. In this case, the level value Y(2) of the frequency component does not exceed the collision judgment threshold. Accordingly, the collision-judging unit 8 does not judge that collision occurs. Thus the air bag is not inflated.

As also clarified from FIGS. 14A and 14B, the high collision judgment threshold is selected when the value of the collision reference data is small, while the low collision judgment threshold is selected when the value of the collision reference data is large. Accordingly, a large margin can be provided for judging collision. Thus erroneous judgment disappears in judgment on collision.

When the judgment on collision is made for a vehicle having a different type of a body structure, the collision reference threshold can be set to be an optimum value for the collision reference data, and the collision reference threshold can be set to an optimum value for the collision reference threshold, corresponding to the vehicle to be subjected to the judgment on collision. Accordingly, it is easy to cope with vehicles of different structure types to be subjected to the judgment on collision.

In the foregoing, the case has been exemplified, in which the difference value in interval integral is used as the collision reference data upon selection of the collision judgment threshold. However, the collision threshold can be also selected in the same manner as described above by using the interval integral value or the infinite integral value, instead of the difference value in interval integral.

Next, another method for setting the collision judgment threshold will be explained.

It is assumed that the collision judgment threshold is given as a linear function which uses the value of the collision reference data as a variable. The linear function is given by a linear expression represented by the following expression (15).

$$TH = As + B \quad (15)$$

In the expression (15), TH represents the collision judgment threshold, c represents the value of the collision reference data, and A and B are constants.

The difference value in interval integral is used as the value of the collision reference data s, and the level value Y(2) of the frequency component is used for the collision judgment data. On this condition, A is set to be $(-1) \leq A < 0$, and B is set to be $B > 0$ concerning the value of the collision reference data $s \geq 0$, while A is set to be $A = 0$ concerning the value of the collision reference data $s < 0$.

Figure 15B:
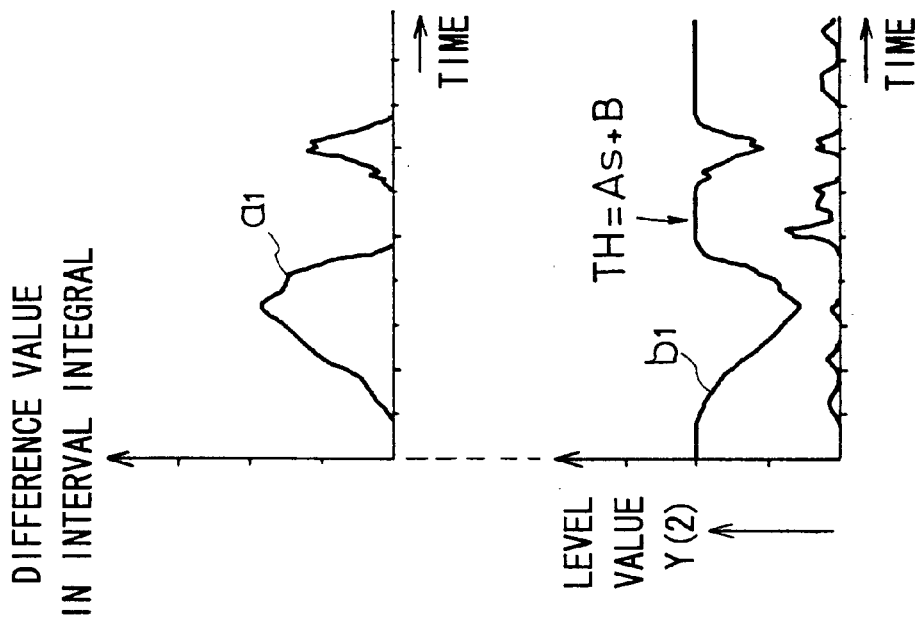
FIG. 15B schematically shows waveforms to be used to explain the judgment on collision in the second embodiment of the method for judging vehicle collision according to the present invention, illustrating output signal waveforms from the acceleration sensor, to make a judgment of no occurrence of collision.
Figure 15A:
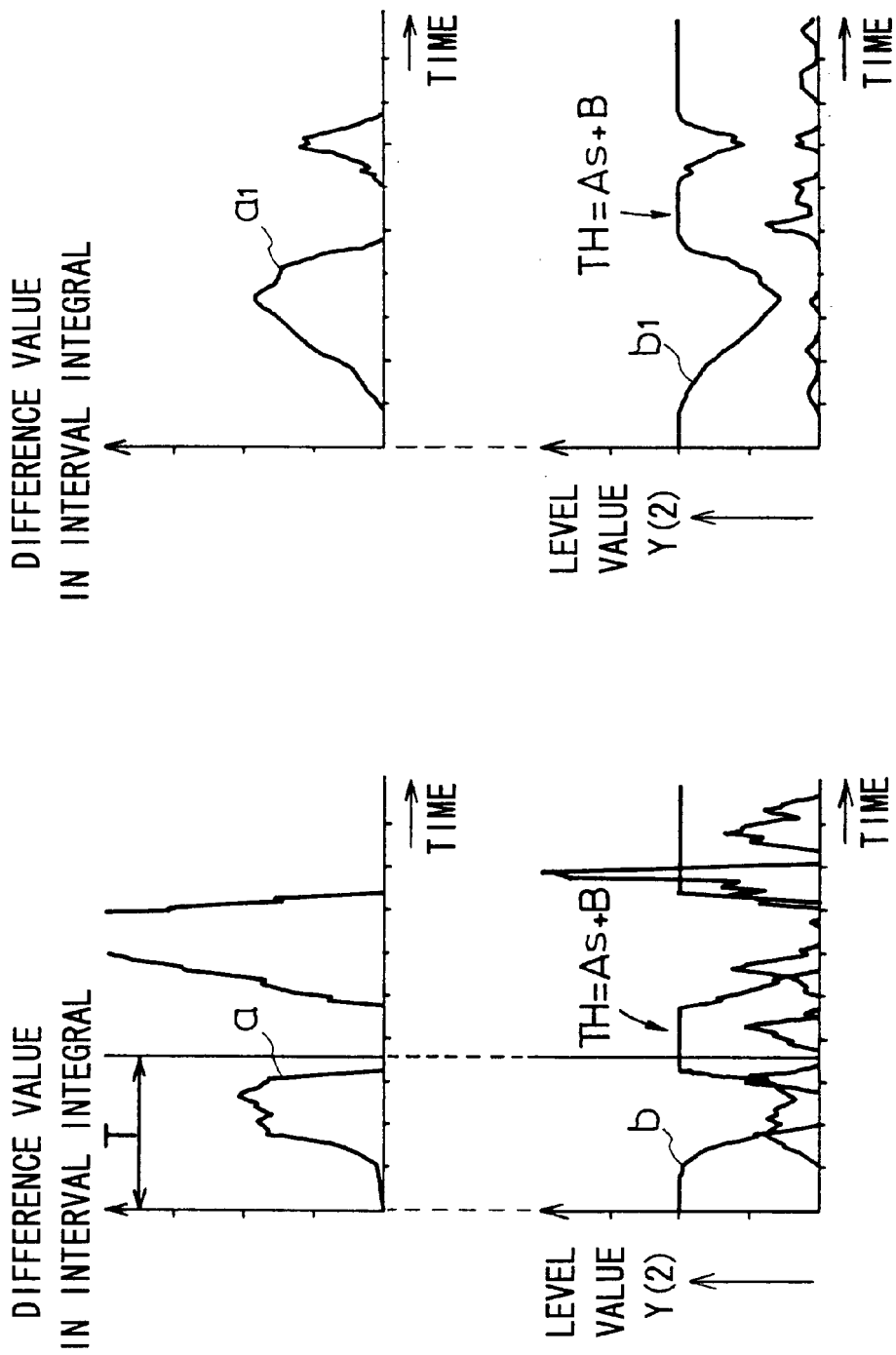
FIG. 15A schematically shows waveforms to be used to explain the judgment on collision in the second embodiment of the method for judging vehicle collision according to the present invention, illustrating output signal waveforms from the acceleration sensor, to make a judgment of occurrence of collision.

On condition of the foregoing setting, the waveform a in FIG. 15A, the waveform a1 in FIG. 15B, the waveform b in FIG. 15A, and the waveform b1 in FIG. 15B represent the same collision reference data and the collision judgment data as those represented by the waveform a1 in FIG. 14A, the waveform a1 in FIG. 14B, the waveform b in FIG. 14A, and the waveform b1 in FIG. 14B. The waveform b in FIG. 15A and the waveform b1 in FIG. 15B are obtained by superimposing the collision judgment threshold TH in accordance with the expression (15), on the collision judgment data.

As clarified from the waveform b in FIG. 15A and the waveform b1 in FIG. 15B, the collision judgment threshold is high when the value of the collision reference data is small, while the collision judgment threshold is low when the value of the collision reference data is large. Accordingly, a large margin is provided for judging collision. Thus it is possible to make a judgment on collision without any error.

In the foregoing, explanation has been made by using the interval integral value, the infinite integral value, or the difference value in interval integral, as the value of the collision reference data. However, it is allowable to use, as the collision reference data, the level value of the frequency component other than the frequency component used as the collision judgment data.

Next, combination of the collision reference data and the collision judgment data will be explained with reference to FIGS. 16A and 16B.

Figure 16B:
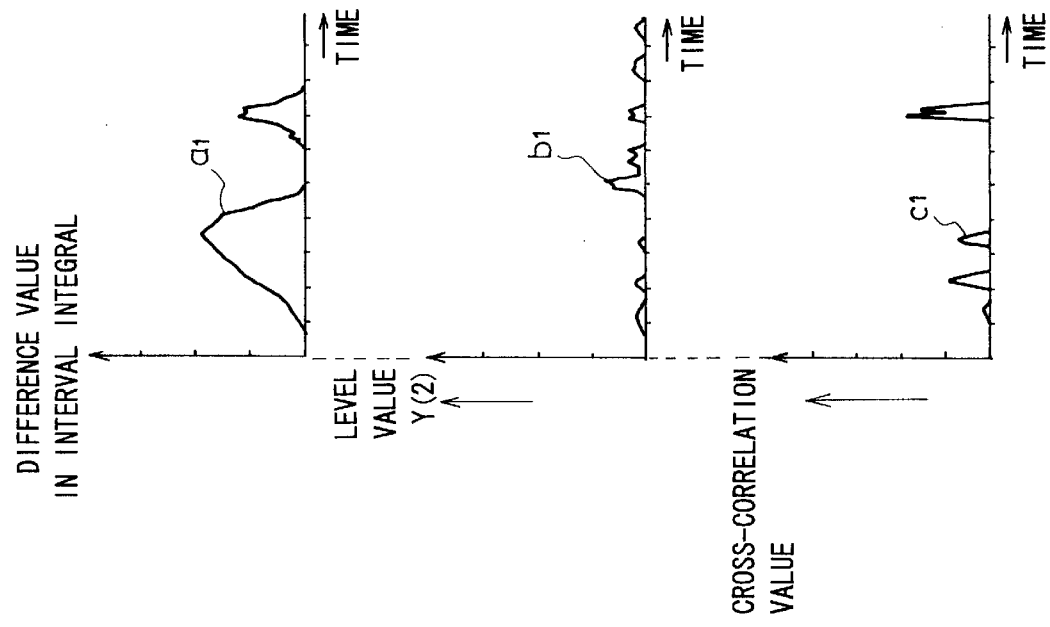
FIG. 16B schematically shows waveforms to be used to explain the judgment on collision in the second embodiment of the method for judging vehicle collision according to the present invention, illustrating output signal waveforms from the acceleration sensor, to make a judgment of no occurrence of collision.
Figure 16A:
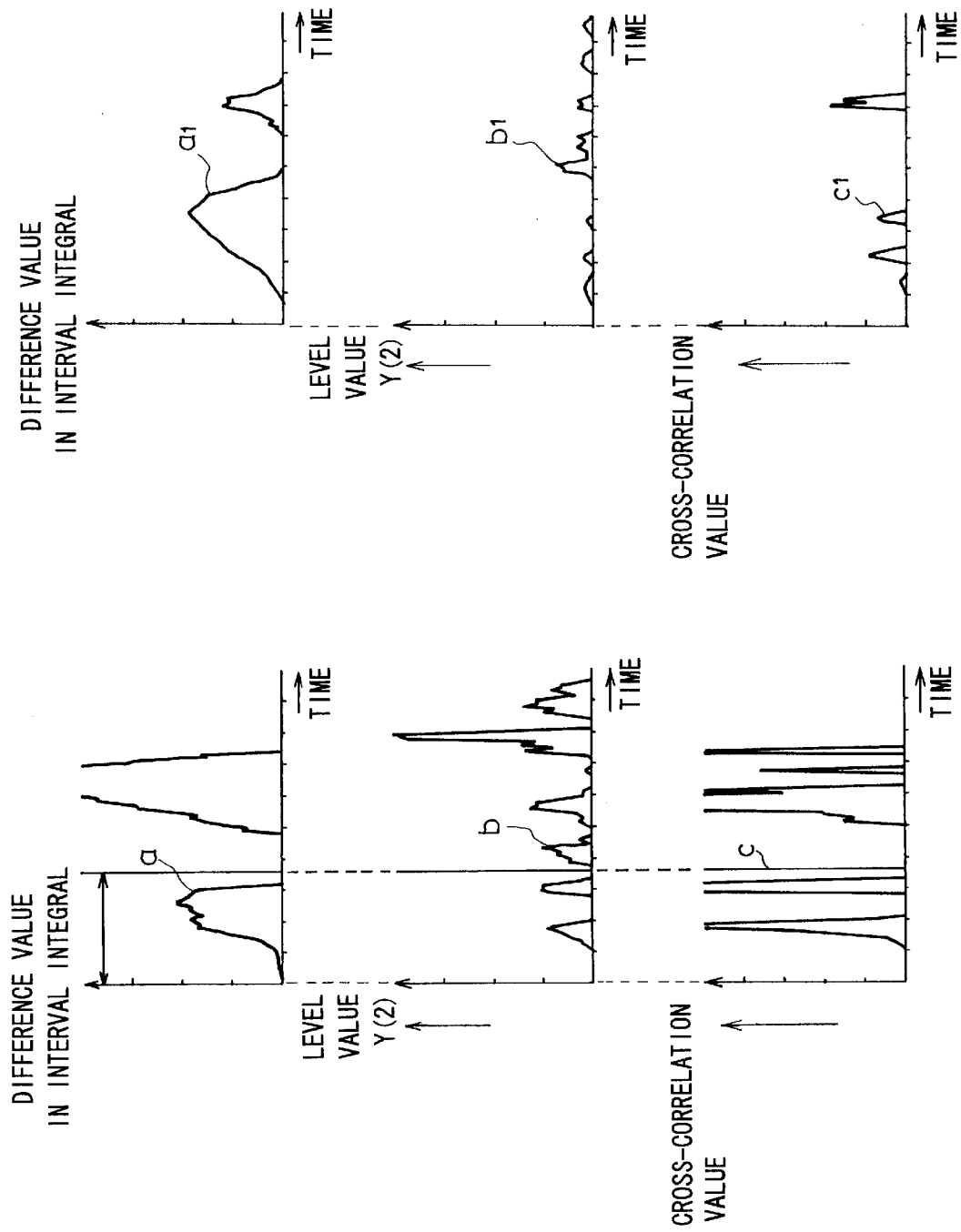
FIG. 16A schematically shows waveforms to be used to explain the judgment on collision in the second embodiment of the method for judging vehicle collision according to the present invention, illustrating output signal waveforms from the acceleration sensor, to make a judgment of occurrence of collision.

The waveform a in FIG. 16A and the waveform a1 in FIG. 16B represent the same collision reference data (difference value in interval integral) as those represented by the waveform a in FIG. 15A and the waveform a1 in FIG. 15B. The waveforms a1, b1 in FIG. 16B represent the same collision judgment data (level value Y(2) of the frequency component) as those represented by the waveform a1 in FIG. 11A and the waveform b1 in FIG. 11B.

A cross-correlation value is determined by multiplying a value at each time of the collision reference data represented by the waveform a in FIG. 16A by a value at each time of the collision judgment data represented by the waveform b in FIG. 16A. The cross-correlation value determined by the multiplication is represented by a waveform c in FIG. 16A. In the same manner as described above, a cross-correlation value is determined by multiplying a value at each time of the collision reference data represented by the waveform a1 in FIG. 16B by a value at each time of the collision judgment data represented by the waveform b1 in FIG. 16B. The cross-correlation value determined by the multiplication is represented by a waveform c1 in FIG. 16B.

In this procedure, the waveforms mutually having strong correlation give a large cross-correlation value. On the contrary, the waveforms mutually having weak correlation give a small cross-correlation value. Thus a combination of the collision reference data and the collision judgment data is selected so that a waveform to be judged to have collision provides a large cross-correlation value, while a waveform to be judged to have no collision provides a small cross-correlation value. The combination of the collision reference data and the collision judgment data selected as described above provides an optimum combination which gives a large threshold spacing between the judgment of occurrence of collision and the judgment of no occurrence of collision.

According to the second embodiment of the method for judging vehicle collision of the present invention, the collision judgment threshold for the collision judgment data can be changed in accordance with the magnitude of the value of the collision reference data and the various combinations of the value of the collision judgment data and the value of the collision reference data obtained from the output from the acceleration sensor. Accordingly, an effect is obtained in that the method can be applied to various types of body structures, and it is possible to widen the spacing between the thresholds for judging occurrence and no occurrence of collision.

According to the second embodiment of the present invention, the decomposition into the frequency components is performed by the Hadamard transform. Accordingly, the operation required for the Hadamard transform includes only addition and subtraction. Thus an effect is obtained in that there is no necessity for a digital signal processor capable of high-speed operation, owing to the Hadamard transform.

Further, the collision judgment threshold for the collision judgment data can be changed in accordance with the magnitude of the value of the collision reference data and the combination of the value of the collision reference data and the value of the collision judgment data. Accordingly, an effect is obtained in that the method can be applied to various types of body structures, and it is possible to make the judgment on collision with a large margin between the judgment of occurrence of collision and the judgment of no occurrence of collision.

What is claimed is:

1. A method for judging vehicle collision, comprising the steps of:

sampling output signals from an acceleration sensor carried on a vehicle at a predetermined sampling cycle;

collecting sampled data in an amount corresponding to a plurality of predetermined continuous sampling cycles to obtain a data group corresponding to an interval window;

preparing said data groups corresponding to said interval windows each of which is successively delayed by one sampling cycle;

decomposing each of said data groups corresponding to each of said interval windows into frequency components in accordance with Hadamard transform; and judging said vehicle collision on the basis of a level value of said decomposed frequency component.

2. A method for judging vehicle collision, comprising the steps of:

sampling output signals from an acceleration sensor carried on a vehicle at a predetermined sampling cycle;

collecting sampled data in an amount corresponding to a plurality of predetermined continuous sampling cycles to obtain a data group corresponding to an interval window;

preparing said data groups corresponding to said interval windows each of which is successively delayed by one sampling cycle;

decomposing each of said data groups corresponding to each of said interval windows into frequency components in accordance with Hadamard transform;

comparing a level value of said decomposed frequency component with a predetermined threshold value set for said frequency component; and judging occurrence of said vehicle collision on the basis of a result of said comparison.

3. A method for judging vehicle collision, comprising the steps of:

determining collision reference data on the basis of an output signal from an acceleration sensor provided on a vehicle;

determining a collision judgment threshold on the basis of a value of said determined collision reference data;

decomposing a waveform of said output signal from said acceleration sensor into frequency components, using a level value of each predetermined frequency component selected from said decomposed frequency components, as collision judgment data; and judging occurrence of collision if said value of said collision judgment data exceeds said collision judgment threshold.

4. The method according to claim 3, wherein said waveform of said output signal from said acceleration sensor is decomposed into said frequency components by means of Hadamard transform.

5. The method according to claim 3, wherein said collision judgment threshold is variable depending on said value of said collision reference data.

6. The method according to claim 3, wherein said collision reference data is an integral value obtained by integrating said output signal from said acceleration sensor, which is set to be zero if said integral value is less than zero.

7. The method according to claim 3, wherein said collision reference data is an integral value obtained by integrating said output signal from said acceleration sensor over a predetermined time interval.

8. The method according to claim 3, wherein said collision reference data is a value of difference between an integral value obtained by integrating said output signal from said acceleration sensor over a predetermined first time interval and an integral value obtained by integrating said output signal from said acceleration sensor over a predetermined second time interval.

9. The method according to claim 3, wherein said collision reference data is a level value of said frequency component other then said frequency component used as said collision judgment data.

10. The method according to claim 3, wherein said value of said collision reference data is compared with at least one predetermined collision reference threshold to distinguish a magnitude of said value of said collision reference data, and said collision judgment threshold for making comparison with said collision judgment data is changed on the basis of said distinguished magnitude of said collision reference data.

11. The method according to claim 3, wherein said collision judgment threshold is given by a linear function based on the use of said value of said collision reference data as a variable.

12. The method according to claim 3, wherein a cross-correlation value relative to said collision reference data and said collision judgment data is computed, and a combination of said collision reference data and said collision judgment data is selected so that said computed cross-correlation value is large when it is necessary to judge occurrence of collision, and said computed cross-correlation value is small when it is necessary to judge no occurrence of collision.

* * * * *